US010281949B2

(12) United States Patent
Kuroda et al.

(10) Patent No.: US 10,281,949 B2
(45) Date of Patent: May 7, 2019

(54) CABLE WIRING STRUCTURE, OPERATION DEVICE, AND WORK MACHINE

(71) Applicant: Kubota Corporation, Osaka-shi (JP)

(72) Inventors: Masahiro Kuroda, Sakai (JP); Keisuke Miura, Sakai (JP); Hiroaki Nakagawa, Sakai (JP); Hayato Kawano, Sakai (JP); Hiroyuki Anami, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 408 days.

(21) Appl. No.: 15/279,508

(22) Filed: Sep. 29, 2016

(65) Prior Publication Data
US 2017/0090506 A1 Mar. 30, 2017

(30) Foreign Application Priority Data

Sep. 29, 2015 (JP) ................................ 2015-191621
May 19, 2016 (JP) ................................ 2016-100479

(51) Int. Cl.
*H02G 3/04* (2006.01)
*G05G 9/047* (2006.01)
(Continued)

(52) U.S. Cl.
CPC ............ *G05G 9/047* (2013.01); *E02F 9/2004* (2013.01); *B60R 16/0215* (2013.01);
(Continued)

(58) Field of Classification Search
CPC ......... G05G 9/047; G05G 2009/04774; G05G 1/04; G05G 25/04; E02F 9/2004; E02F 3/3405; E02F 3/3414; E02F 9/16; B60R 16/0215; B60R 16/00; B60R 16/0207; B60K 20/02; H02G 3/04; H02G 3/0406
(Continued)

(56) References Cited

U.S. PATENT DOCUMENTS 3,997,040 A * 12/1976 O'Neill ................. B60K 20/02
192/218
5,261,291 A * 11/1993 Schoch .................. B60K 37/06
180/333
(Continued)

FOREIGN PATENT DOCUMENTS

JP 57-006626 U 1/1982
JP 60-012511 1/1985
(Continued)

OTHER PUBLICATIONS

Japanese Office Action for corresponding JP Application No. 2015-191621, dated Sep. 21, 2018 (w/ machine translation).

*Primary Examiner* — Angel R Estrada
(74) *Attorney, Agent, or Firm* — Mori & Ward, LLP

(57) ABSTRACT

A cable wiring structure includes a cable, a first holder, and a second holder. The cable connects a first appliance mounted in a work machine and a second appliance mounted in the work machine to transmit an electric signal. The cable includes a first held part and a second held part different from the first held part. The first holder holds the cable at the first held part. The second holds the cable at the second held part. A first range in which the cable bends at the first held part is smaller than a second range in which the cable bends at the second held part.

16 Claims, 17 Drawing Sheets

(51) Int. Cl.
*E02F 9/20* (2006.01)
*E02F 3/34* (2006.01)
*B60R 16/02* (2006.01)

(52) U.S. Cl.
CPC .......... *E02F 3/3405* (2013.01); *E02F 3/3414* (2013.01); *G05G 2009/04774* (2013.01)

(58) Field of Classification Search
USPC ......... 174/68.1, 68.3, 260, 70 R, 72 A, 73.1, 174/74 R; 248/68.1, 49
See application file for complete search history.

(56) References Cited

U.S. PATENT DOCUMENTS

| | | | | |
|---|---|---|---|---|
| 5,293,900 | A * | 3/1994 | Karbassi | B66C 13/56 137/554 |
| 6,246,591 | B1 * | 6/2001 | Ikeda | H01R 13/72 174/72 A |
| 6,575,760 | B2 * | 6/2003 | Doshita | H02G 11/00 174/72 A |
| 8,242,366 | B2 * | 8/2012 | Katou | H02G 11/003 174/68.1 |
| 8,513,559 | B2 * | 8/2013 | Brandstrom | B23K 9/048 219/76.1 |
| 8,573,681 | B2 * | 11/2013 | Yamato | B60R 16/0215 296/190.01 |
| 10,141,731 | B2 * | 11/2018 | Pawluk | H02G 3/0437 |

FOREIGN PATENT DOCUMENTS

| | | |
|---|---|---|
| JP | 11-115523 | 4/1999 |
| JP | 2000-330661 | 11/2000 |
| JP | 4475760 B2 | 2/2002 |
| JP | 2002-339405 | 11/2002 |
| JP | 2010-052557 | 3/2010 |
| JP | 4987116 B2 | 7/2012 |

* cited by examiner

CABLE WIRING STRUCTURE, OPERATION DEVICE, AND WORK MACHINE

CROSS-REFERENCE TO RELATED APPLICATIONS

The present application claims priority under 35 U. S. C. § 119 to Japanese Patent Application No. 2015-191621, filed Sep. 29, 2015 and Japanese Patent Application No. 2016-100479, filed May 19, 2016. The contents of these applications are incorporated herein by reference in their entirety.

BACKGROUND OF THE INVENTION

Field of the Invention

The present invention relates to a cable wiring structure, an operation device, and a work machine.

Discussion of the Background

Conventionally, the technique disclosed in JP 2000-330661 A is known as a cable wiring structure of a work machine. In the technique disclosed JP 2000-330661 A, an operation lever is swingably attached onto a base, and a cable (wire harness) is connected to the operation lever.

SUMMARY OF THE INVENTION

According to one aspect of the present invention, a cable wiring structure includes a cable, a first holder, and a second holder. The cable connects a first appliance mounted in a work machine and a second appliance mounted in the work machine to transmit an electric signal. The cable includes a first held part and a second held part different from the first held part. The first holder holds the cable at the first held part. The second holds the cable at the second held part. A first range in which the cable bends at the first held part is smaller than a second range in which the cable bends at the second held part.

According to another aspect of the present invention, an operation device includes a grip part, a shaft, and the cable wiring structure. The shaft is attached to the grip part. The cable reaches the grip part.

According to further aspect of the present invention, a work machine includes the cable wiring structure, the first appliance, and the second appliance.

According to further aspect of the present invention, an operation device includes a grip part, a shaft, an operation valve, a main body, a harness, and a guide member. The shaft is attached to the grip part. The operation valve is connected to the shaft to act in accordance with a swing of the shaft. In the main body the operation valve is contained. The harness circles around the shaft from the main body to an inside of the grip part. The guide member is provided between the main body and the grip part and guides the harness.

According to further aspect of the present invention, an operation device includes a grip part, a shaft, a harness, and a guide member. The shaft is attached to the grip part. The shaft extends in a longitudinal direction and has a first end and a second end opposite to the first end in the longitudinal direction. The harness circles around the shaft from the first end to the second end. The guide member guides the harness.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
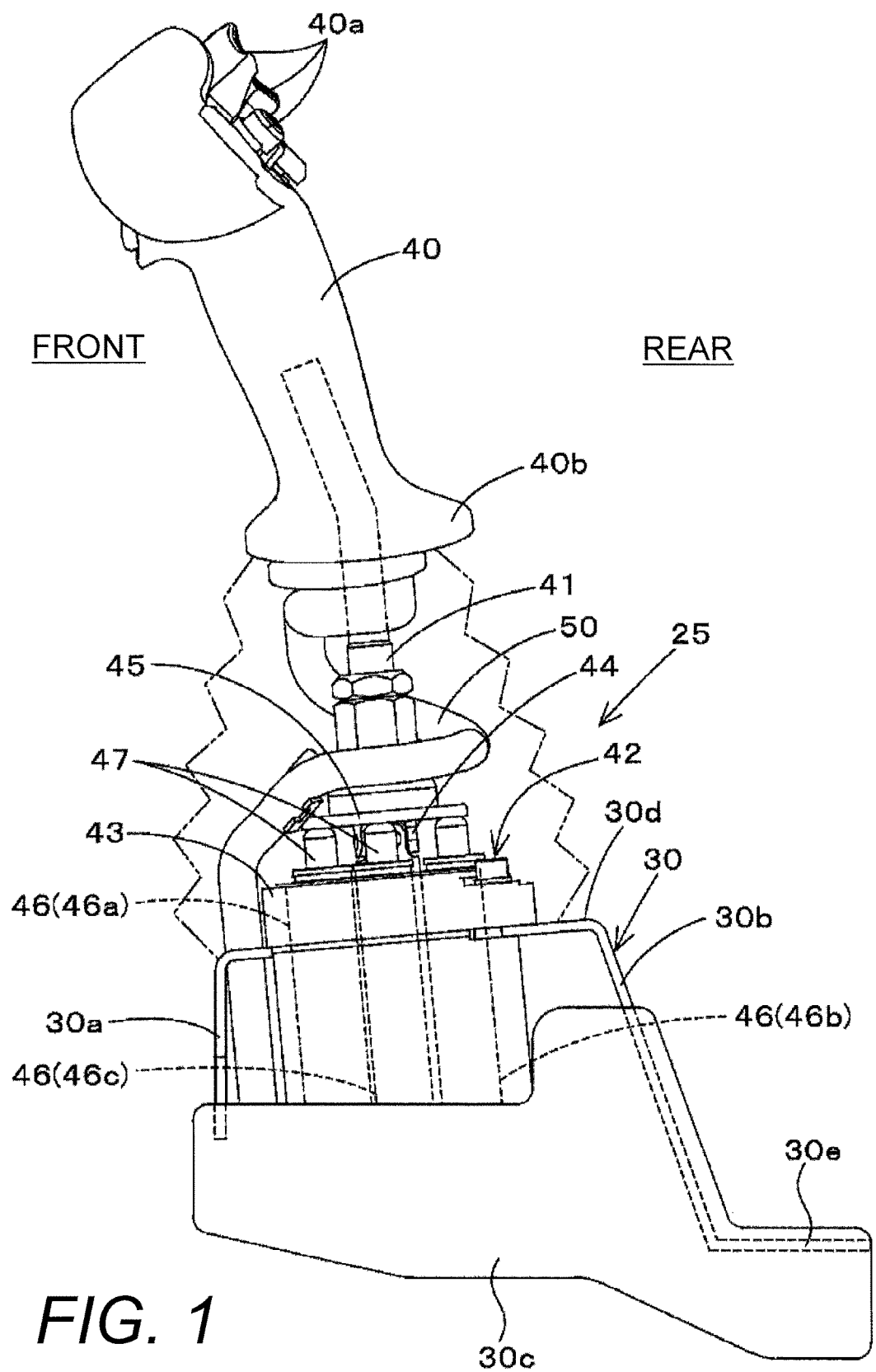
FIG. 1 is a side view of an operation device.

The embodiments will now be described with reference to the accompanying drawings, wherein like reference numerals designate corresponding or identical elements throughout the various drawings.

First Embodiment

Figure 16:
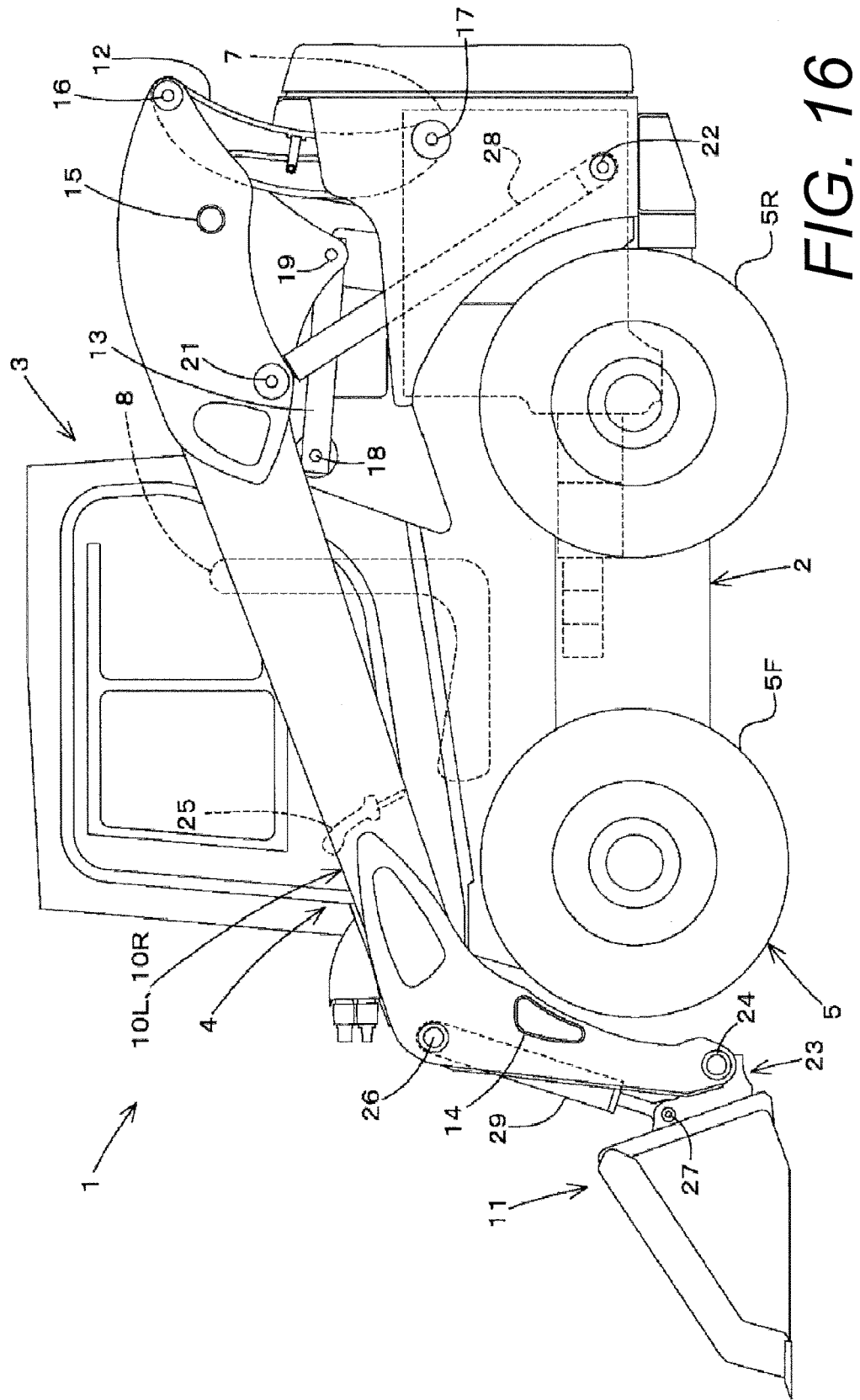
FIG. 16 is an overall view of a skid steer loader.

FIG. 16 is an overall view of a skid steer loader having a cable wiring structure, i.e., a cable routing structure according to an embodiment of the present invention. In the present embodiment, a skid steer loader is illustrated as a work machine including a cable wiring structure. However, the work machine is not limited to this. For example, the work machine may be a compact track loader, a wheel loader, a backhoe, a tractor, a combine harvester, a rice transplanter, or the like.

As illustrated in FIG. 16, a skid steer loader 1 includes a frame (body) 2, a cabin 3 mounted on the frame 2, a working device 4 attached to the frame 2, and travelling devices 5 provided on the left and right of the frame 2.

An engine 7 is mounted in a rear part of the frame 2. A driver's seat 8 is provided in the cabin 3. An operation device 25 is provided beside the driver's seat 8, e.g., outside the driver's seat 8 in the width direction.

The working device 4 includes a boom 10L provided on the left, a boom 10R provided on the right, and a bucket 11, which is a working tool. The booms 10L and 10R are disposed on the right and left of the cabin 3 and the frame 2, respectively. The bucket 11 is provided at a front end (anterior end) of the pair of booms 10L and 10R so as to be capable of swinging upward and downward.

Furthermore, the working device 4 includes a lift link 12, a control link 13, a boom cylinder 28, and a bucket cylinder 29. The lift link 12 and the control link 13 support base sides (rear sides) of the booms 10L and 10R. The boom cylinder 28 lifts or lowers the booms 10L and 10R, and the bucket cylinder 29 swings the bucket 11. Each of the boom cylinder 28 and the bucket cylinder 29 is constituted by a double-acting hydraulic cylinder.

The front ends of the booms 10L and 10R are linked with each other by an anterior linking member 14 that is constituted by a deformed pipe. The bases of the booms 10L and 10R are linked with each other by a posterior linking member 15 that is constituted by a circular pipe. Each of the lift link 12, the control link 13, and the boom cylinder 28 is provided on the left and right of the frame 2 so as to correspond to the booms 10L and 10R.

The lift link 12 is disposed on a rear end side of the booms 10L and 10R. For example, the lift link 12 is provided on a rear end side of the frame 2 and on the outer side of the frame 2 in the width direction. An upper end side of the lift link 12 is pivotably supported by rear end sides of the bases of the booms 10L and 10R with the use of a shaft 16 (first shaft) so as to be rotatable about a horizontal axis. A lower end side of the lift link 12 is pivotably supported by an upper part of the rear end side of the frame 2 with the use of a shaft 17 (second shaft) so as to be rotatable about a horizontal axis.

The control link 13 is disposed ahead of the lift link 12. A front end side of the control link 13 is pivotably supported by the frame 2 with the use of a shaft 18 (third shaft) so as to be rotatable about a horizontal axis. A rear end side of the control link 13 is pivotably supported by a lower end of an intermediate part in the front-rear direction of the base sides of the booms 10L and 10R with the use of a shaft 19 (fourth shaft) so as to be rotatable about a horizontal axis.

An upper part of the boom cylinder 28 is pivotably supported by the base sides of the booms 10L and 10R with the use of a first boom cylinder pin 21 so as to be rotatable about a horizontal axis. A lower part of the boom cylinder 28 is pivotably supported by a lower part of the rear end side of the frame 2 with the use of a second boom cylinder pin 22 so as to be rotatable about a horizontal axis. By stretching or contracting the boom cylinder 28, the booms 10L and 10R swing up and down about the first shaft 16 so that front end sides (the bucket 11) of the booms 10L and 10R are lifted or lowered while the base sides of the booms 10L and 10R are supported by the lift link 12 and the control link 13.

The control link 13 swings up and down about the third shaft 18 in accordance with upward and downward swinging of the booms 10L and 10R. The lift link 12 swings back and forth about the second shaft 17 in accordance with upward and downward swinging of the control link 13.

The bucket 11 is detachably attached to a mounting body 23 that is pivotably supported by the front end sides (anterior sides) of the booms 10L and 10R. The mounting body 23 is pivotably supported by the front end sides of the booms 10L and 10R with the use of a pivotably supporting pin 24 so as to be swingable about a horizontal axis. An attachment (spare attachment) such as hydraulic crusher, a hydraulic breaker, an angle bloom, an earth auger, a pallet fork, a sweeper, a mower, or a snow blower may be attached to the mounting body 23 instead of the bucket 11.

The bucket cylinder 29 is disposed on an inner side in the width direction of the front ends of the booms 10L and 10R. An upper end side of the bucket cylinder 29 is pivotably supported by the booms 10L and 10R with the use of a first bucket cylinder pin 26 so as to be rotatable about a horizontal axis. A lower end side of the bucket cylinder 29 is pivotably supported by the mounting body 23 with the use of a second bucket cylinder pin 27 so as to be rotatable about a horizontal axis. When the bucket cylinder 29 stretches or contracts, the bucket 11 swings.

In the present embodiment, a wheel-type travelling device having front wheels 5F and rear wheels 5R is employed as the travelling device 5. Note that a crawler-type (including a semi-crawler-type) travelling device may be employed as the travelling device 5.

The operation device (maneuvering device) 25 illustrated in FIG. 1 is for operating (maneuvering) the skid steer loader. For example, various attachments provided on the skid steer loader can be operated by the operation device 25. The attachments can be operated by various methods, but an operation method using the operation device 25 is not limited to a specific one.

Figure 4:
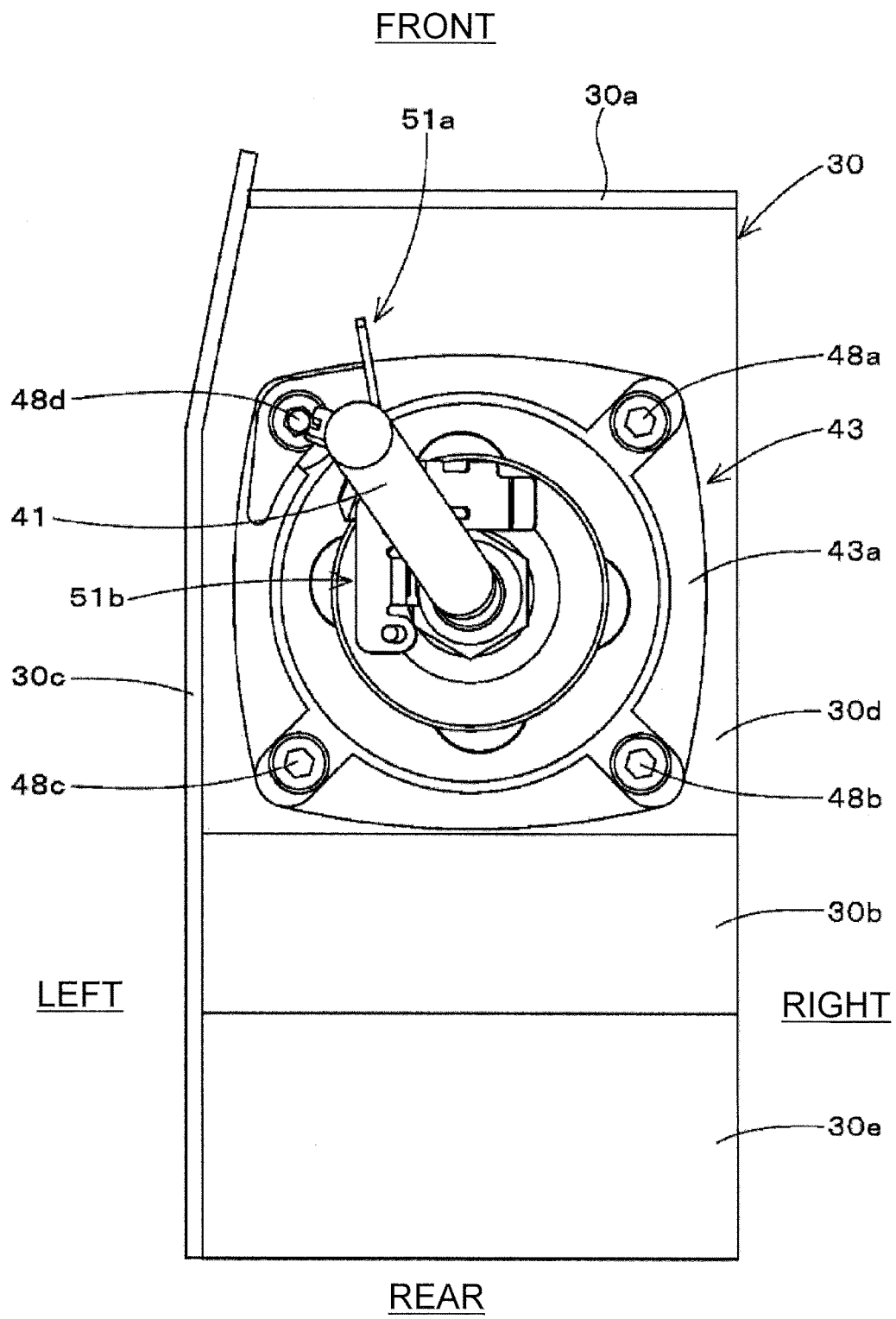
FIG. 4 is a plan view illustrating a case where the main body is attached to the frame.

As illustrated in FIG. 1, the operation device 25 is supported by a frame 30 provided on the left or the right of the driver's seat 8. The frame 30 is attached to a maneuvering platform (not illustrated) attached to the frame 2. Directions in the following description are mainly ones that are viewed from an operator sitting on the driver's seat 8. The leftward direction of FIG. 1 is a forward direction, the rightward direction of FIG. 1 is a backward direction, the leftward direction of FIG. 4 is a leftward direction, and the rightward direction of FIG. 4 is a rightward direction.

As illustrated in FIGS. 1 through 4, the frame 30 includes a front plate member 30a, a rear plate member 30b, a left plate member 30c, a first upper plate member 30d, and a second upper plate member 30e. Each of the front plate member 30a, the rear plate member 30b, the left plate member 30c, the first upper plate member 30d, and the second upper plate member 30e is a plate member.

The front plate member 30a is provided ahead of the operation device 25. The rear plate member 30b is provided behind the operation device 25 and is located away on the rear side from the front plate member 30a. The left plate member 30c is provided on the left of the operation device 25 and links a left end of the front plate member 30a and a left end of the rear plate member 30b. The first upper plate member 30d links an upper end of the front plate member 30a, an upper end of the rear plate member 30b, and an upper end of the left plate member 30c. The second upper plate member 30e is provided behind the rear plate member 30b and links a lower end of the rear plate member 30b and the left plate member 30c.

The first upper plate member 30d has a cutout part 31 having a semi-circular shape. Furthermore, the first upper plate member 30d has a plurality of attachment holes 32. The attachment holes 32 are circular edge portions formed in the first upper plate member 30d. The plurality of attachment holes 32 include a first attachment hole 32a provided at a right front part of the first upper plate member 30d, a second attachment hole 32b provided at a right rear part of the first upper plate member 30d, and a third attachment hole 32c provided at a left rear part of the first upper plate member 30d.

Figure 2:
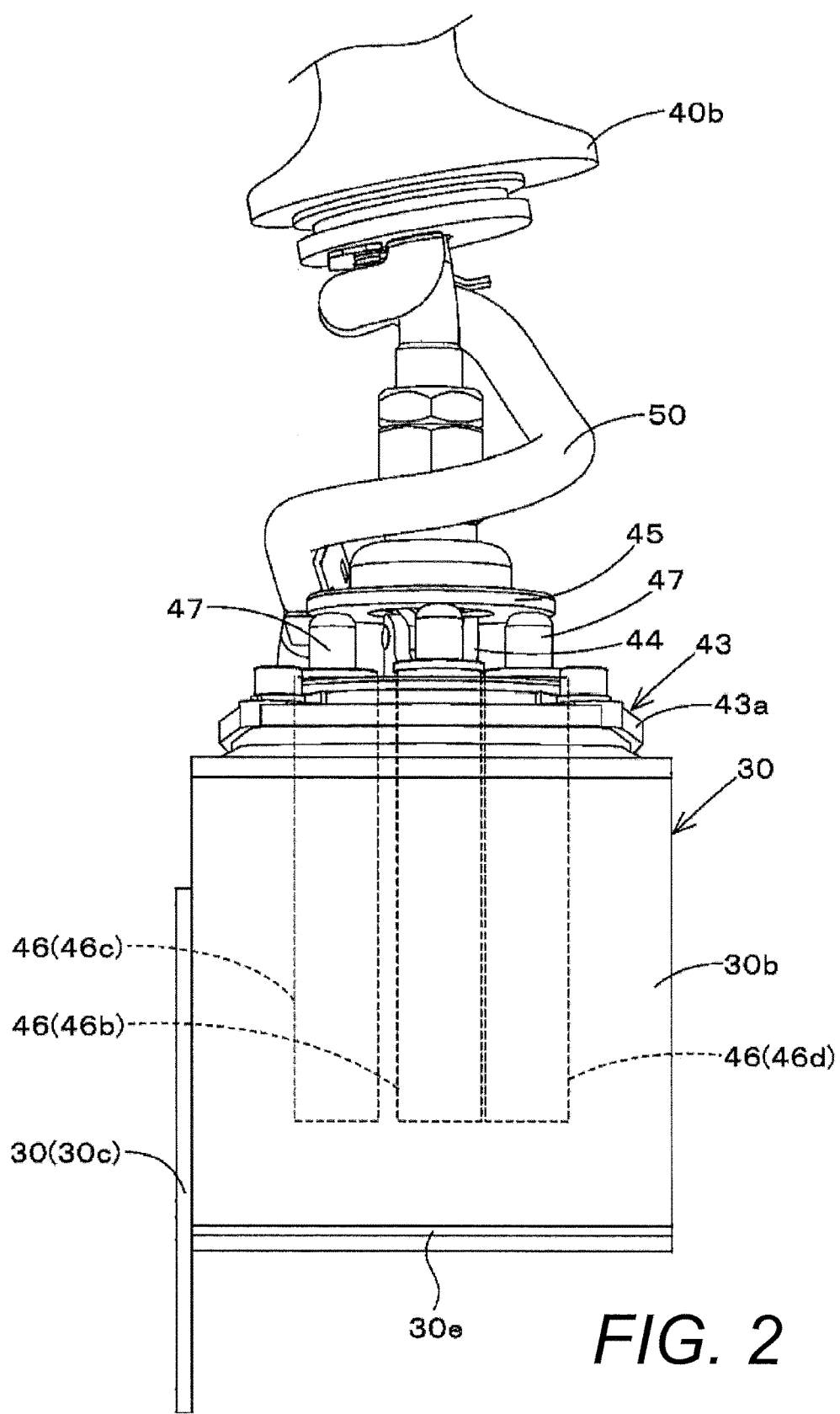
FIG. 2 is a back view of the operation device.

As illustrated in FIGS. 1 and 2, the operation device 25 is a device for operating an attachment by changing the pressure of operating oil that is output in accordance with an operation. The operation device 25 includes a grip part 40 and a shaft 41. Furthermore, the operation device 25 includes an operation unit 42.

The grip part 40 is a cylindrical member that is made of resin or the like and can be gripped by an operator. The grip part 40 has an operation tool 40a for an operation. The operation tool 40a is, for example, a see-saw type switch that is swingable, a slide-type switch that is slidable, or a push-type switch that is capable of being pressed. The operation tool 40a is not limited to these switches and may be any member.

The shaft 41 is attached to the grip part 40 and is supported so as to be swingable forward, backward, leftward, and rightward. For example, a base end part (lower end part) of the shaft 41 is linked to a main body 43 of the operation unit 42 that will be described later with a support member 44 such as a universal joint interposed therebetween. A pressure member 45 whose tilt changes in accordance with a swing of the shaft 41 is provided on the lower end part of the shaft 41. Note that the shaft 41 illustrated in FIGS. 1 and 2 linearly extends from a central part of the main body 43 and is bent forward and leftward in the grip part 40. However, the shaft 41 need not necessarily be bent, and the shape of the shaft 41 is not limited to a specific one.

The operation unit 42 includes operation valves 46 and the main body 43 in which the operation valves 46 are contained. The operation valves 46 are valves whose degree of opening is changed by a swing of the shaft 41. For example, operating oil (oil) is fed to the operation valves 46, and the operation valves 46 can set the pressure and the like of the oil (operating oil) to be fed to various kinds of hydraulic equipment mounted in the work machine 1. The operation valves 46 include a front operation valve 46a, a rear operation valve 46b, a left operation valve 46c, and a right operation valve 46d. The front operation valve 46a acts in a case where the shaft 41 is swung forward. The rear operation valve 46b acts in a case where the shaft 41 is swung backward. The left operation valve 46c acts in a case where the shaft 41 is swung leftward. The right operation valve 46d acts in a case where the shaft 41 is swung rightward. Each of the front operation valve 46a, the rear operation valve 46b, the left operation valve 46c, and the right operation valve 46d has a rod 47. The rod 47 protrudes from an upper surface of the main body 43 and can make contact with the pressure member 45.

Accordingly, when the shaft 41 is swung forward, the rod 47 of the front operation valve 46a is pressed by the pressure member 45, and the degree of opening of the front operation valve 46a is set in accordance with an angle of the swinging. When the shaft 41 is swung backward, the rod 47 of the rear operation valve 46b is pressed by the pressure member 45, and the degree of opening of the rear operation valve 46b is set in accordance with an angle of the swinging. When the shaft 41 is swung leftward, the rod 47 of the left operation valve 46c is pressed by the pressure member 45, and the degree of opening of the left operation valve 46c is set in accordance with an angle of the swinging. When the shaft 41 is swung rightward, the rod 47 of the right operation valve 46d is pressed by the pressure member 45, and the degree of opening of the right operation valve 46d is set in accordance with an angle of the swinging.

Figure 3:
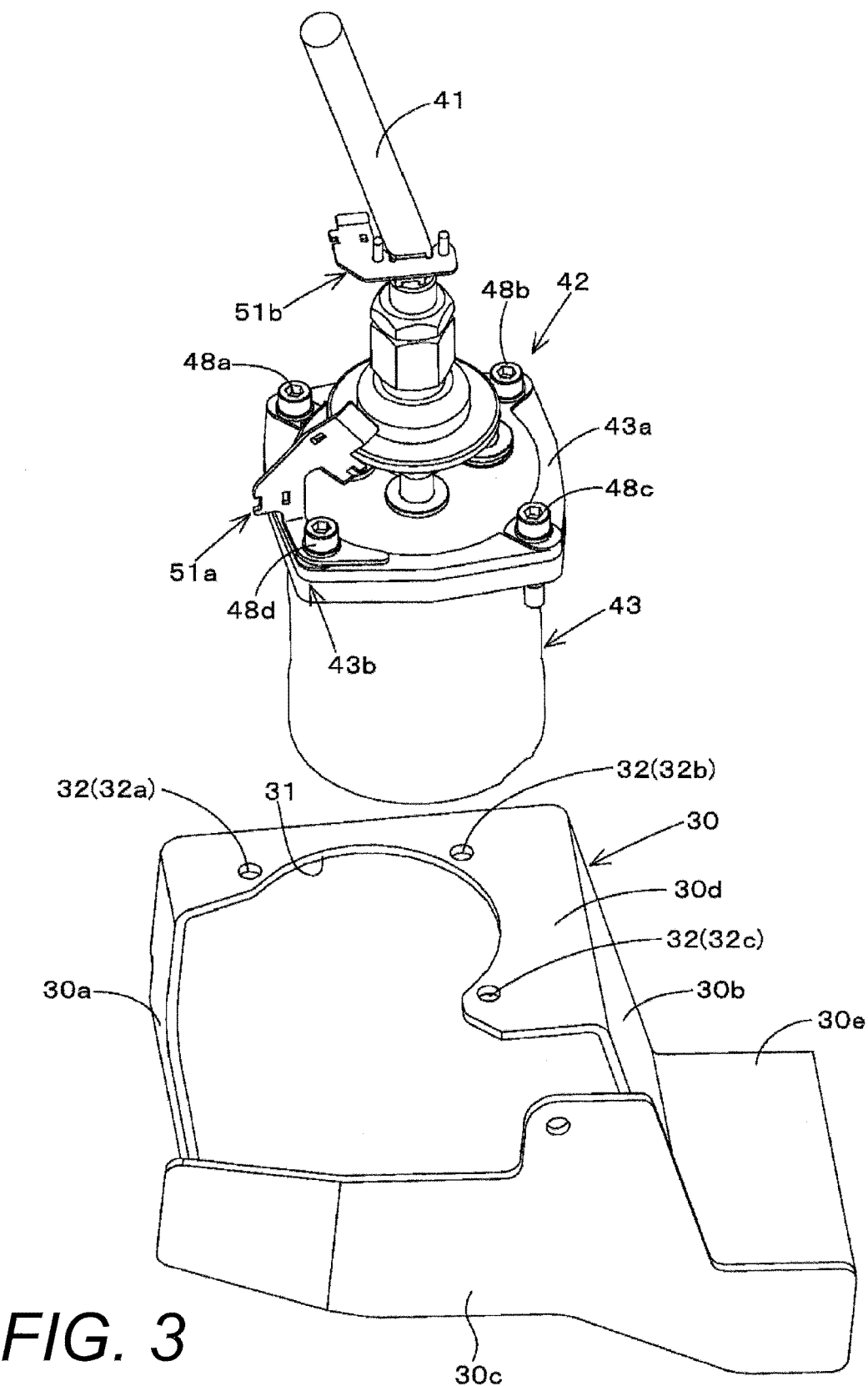
FIG. 3 is a perspective view illustrating a relation between a frame and a main body.

As illustrated in FIGS. 1 through 3, the main body 43 has a cylindrical shape. The operation valves 46 are contained in the main body 43. The main body 43 has, on an upper part thereof, a flange 43a that protrudes to an outside. The flange 43a has a rectangular shape in a plan view and has, at front left and right parts thereof and at rear left and right parts thereof, insertion holes into which fasteners 48a, 48b, and 48c such as bolts are to be inserted. The main body 43 can be attached to the first upper plate member 30d of the frame 30 by fitting the main body 43 into the cutout part 31 of the first upper plate member 30d and then passing the fastener 48a inserted into the insertion hole of the flange 43a through the first attachment hole 32a, passing the fastener 48b inserted into the insertion hole of the flange 43a through the second attachment hole 32b, and passing the fastener 48c inserted into the insertion hole of the flange 43a through the third attachment hole 32c.

Figure 5:
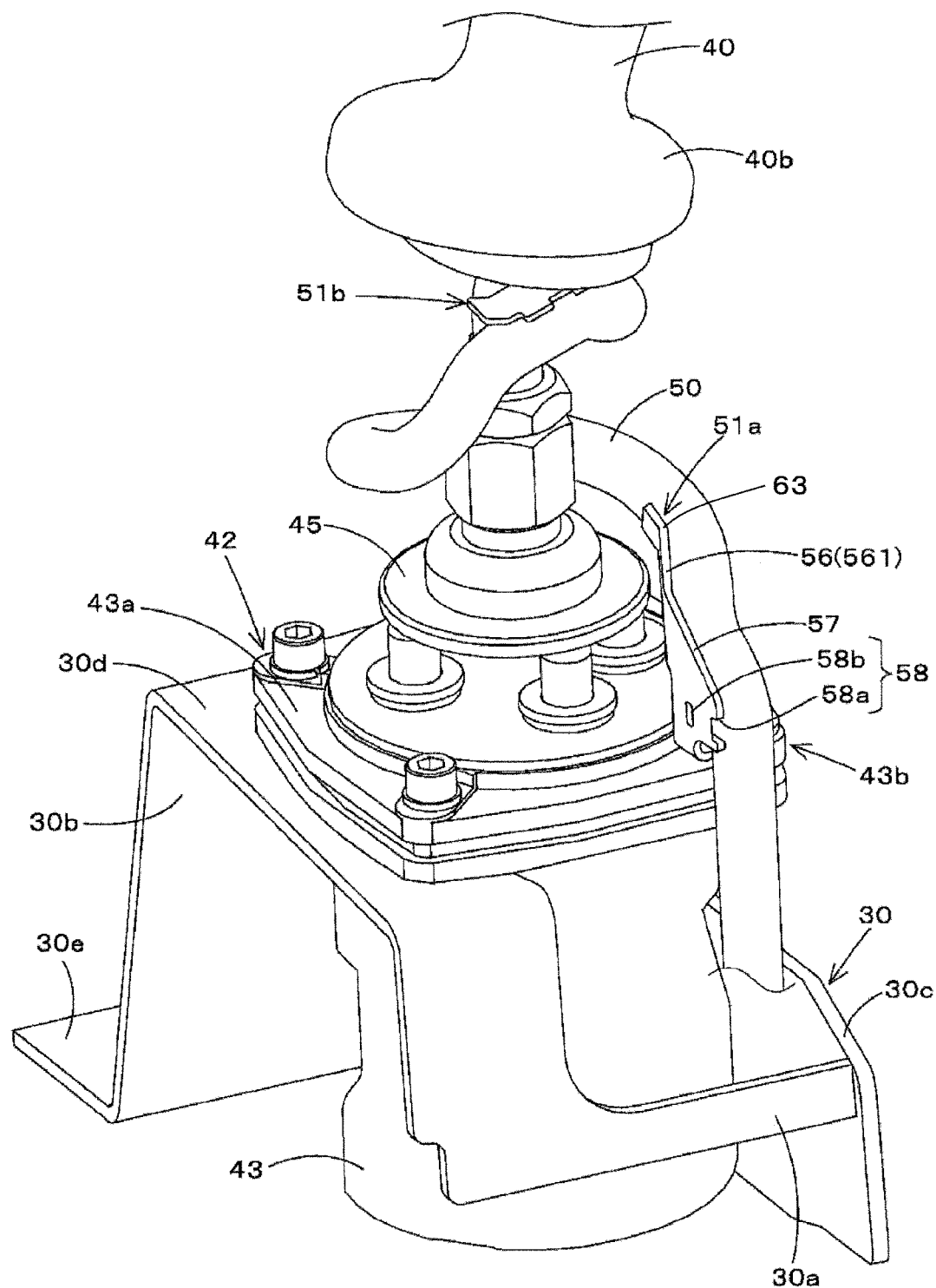
FIG. 5 is a first perspective view of the operation device.
Figure 6:
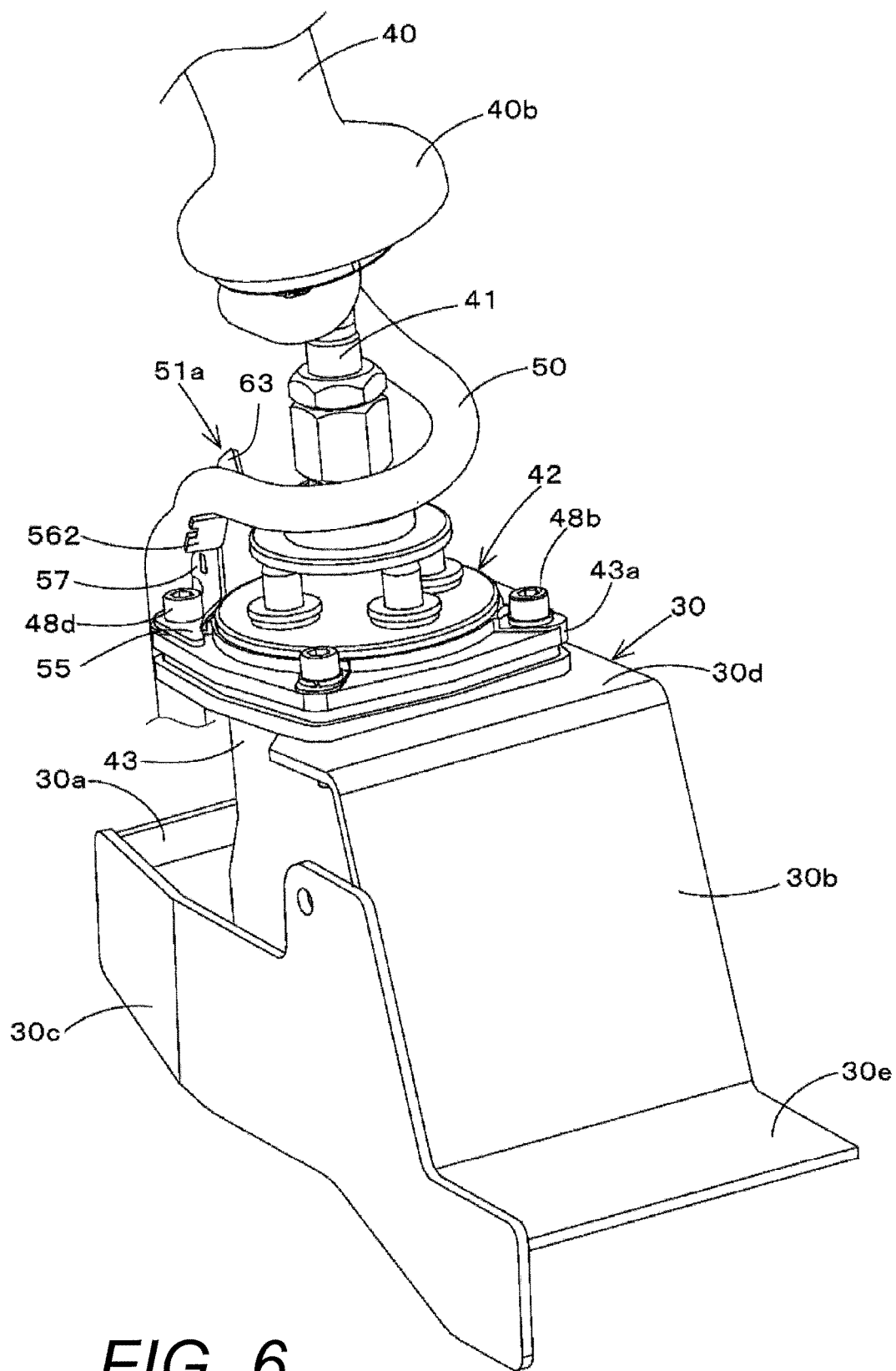
FIG. 6 is a second perspective view of the operation device.
Figure 7:
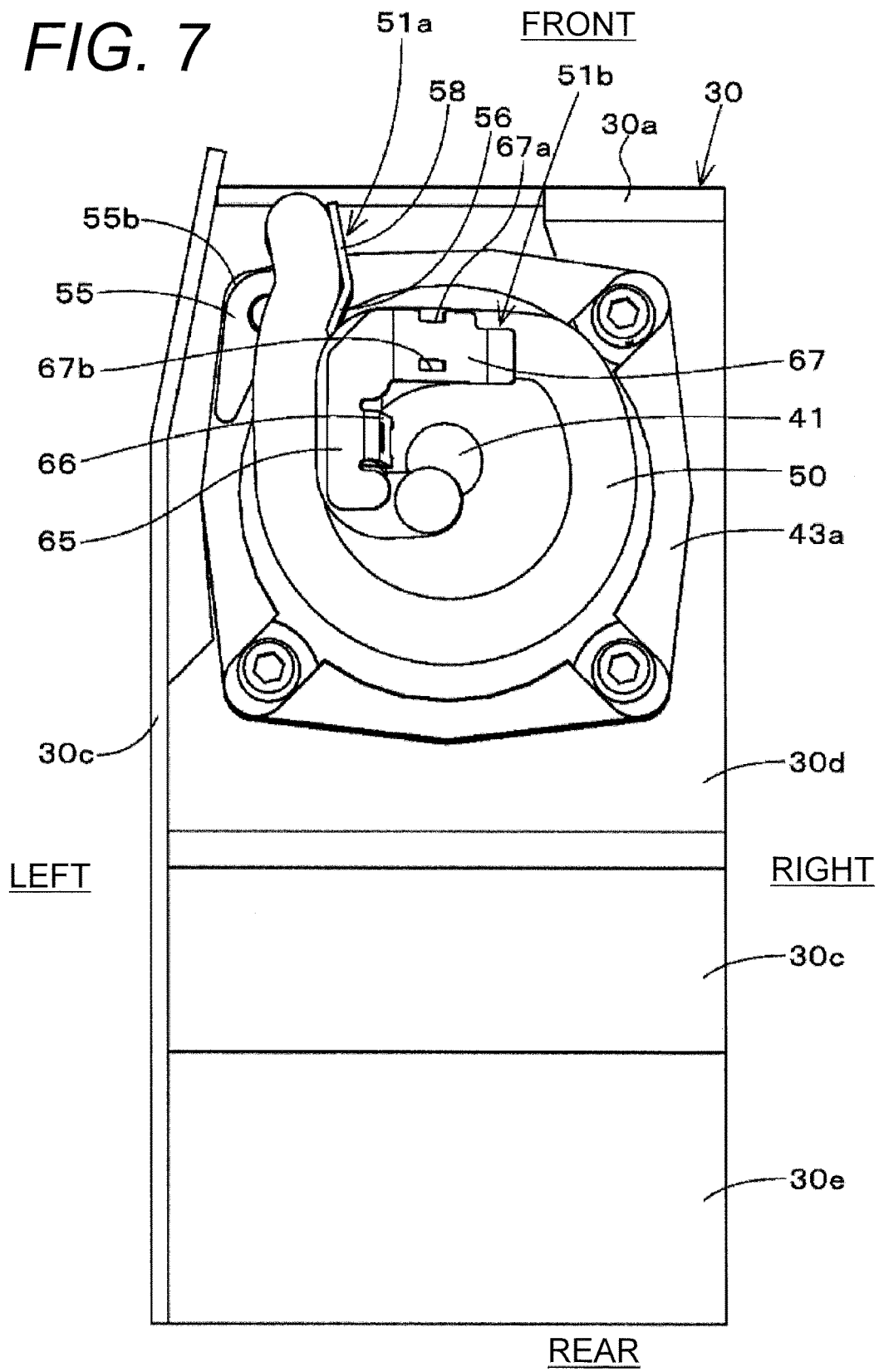
FIG. 7 is a first explanatory view for explaining circling of a cable.

As illustrated in FIGS. 5 through 7, the operation device 25 has a cable 50 (harness 50) and a bracket 51 (guide members 51). The cable 50 (harness 50) is a wire harness having a structure in which a bundle of a plurality of electric wires is contained in a tube. The cable 50 (harness 50) is a cable having flex resistance and has a structure such that the electric wires are movable in the tube. Specifically, for example, the cable 50 (harness 50) has a structure in which a thin film made of paper or resin and having good smoothness (small coefficient of friction) is interposed between the electric wires and the tube, a structure in which powder is interposed between the electric wires and the tube, a structure in which a gap is provided between the electric wires and the tube, or the like.

Figure 8:
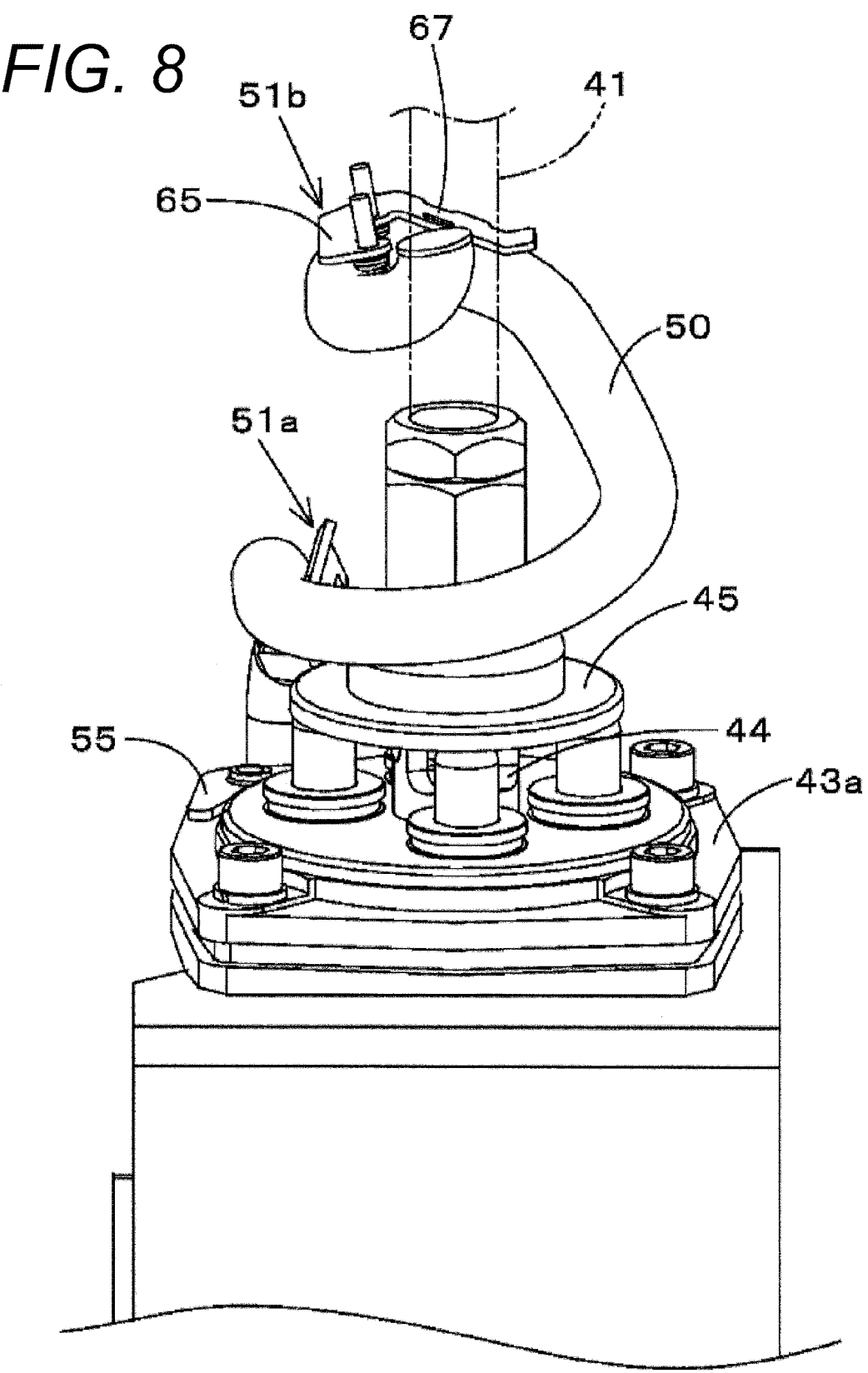
FIG. 8 is a second explanatory view for explaining circling of the cable.

As illustrated in FIGS. 5 and 8, the plurality of guide members 51 are members that guide (set) the cable 50 (the harness 50) in a route through which the harness 50 travels from the main body 43 (flange 43a) to the grip part 40 while circling around the shaft 41. The plurality of guide members 51 are provided between the main body 43 (flange 43a) and the grip part 40. Specifically, the plurality of guide members 51 include a first guide member 51a (a bracket 51a) provided on the flange 43a of the main body 43 and a second guide member 51b (a bracket 51b) provided close to the grip part 40. That is, in the present embodiment, the first guide member 51a (the bracket 51a) and the second guide member 51b (the bracket 51b) are provided on the main body 43 side and on the grip part 40 side, respectively, so as to be located between the main body 43 (flange 43a) and the grip part 40.

The cable 50 (harness 50) is a cable that transmits an electric signal and connect a first appliance and a second appliance that are mounted in the work machine 1. In the present embodiment, the first appliance is the operation device 25, and the second appliance is an appliance (e.g., an ECU (not illustrated)) to which an electric signal based on an operation of the operation device 25 is transmitted.

The cable 50 (harness 50) passes through the frame 30, passes through at least a periphery of the shaft 41, and reaches the grip part 40. In the present embodiment, the cable 50 (harness 50) reaches the shaft 41 by passing through the main body 43 and reaches the grip part 40 by passing beside the shaft 41. Between the main body 43 and the grip part 40, the cable 50 (harness 50) extends from the main body 43 to the grip part 40 while circling around the shaft 41. In other words, between the main body 43 and the grip part 40, the cable 50 (harness 50) extends spirally around the shaft 41.

More specifically, the cable 50 (harness 50) reaches the flange 43a of the main body 43 from below the main body 43 and extends to a vicinity of a left corner 43b that is on a front side of the flange 43a. The cable 50 (harness 50) extends toward the upper side (the grip part 40) and toward the rear side from the vicinity of the corner 43b. Furthermore, the cable 50 (harness 50) circles rightward while travelling upward and then extends forward while travelling upward. The cable 50 (harness 50) circles leftward while travelling upward in the vicinity of the front part of the first upper plate member 30*d*, circles rightward again, and then reaches the grip part 40.

A wiring structure of a cable that extends around a shaft is described below.

Figure 10:
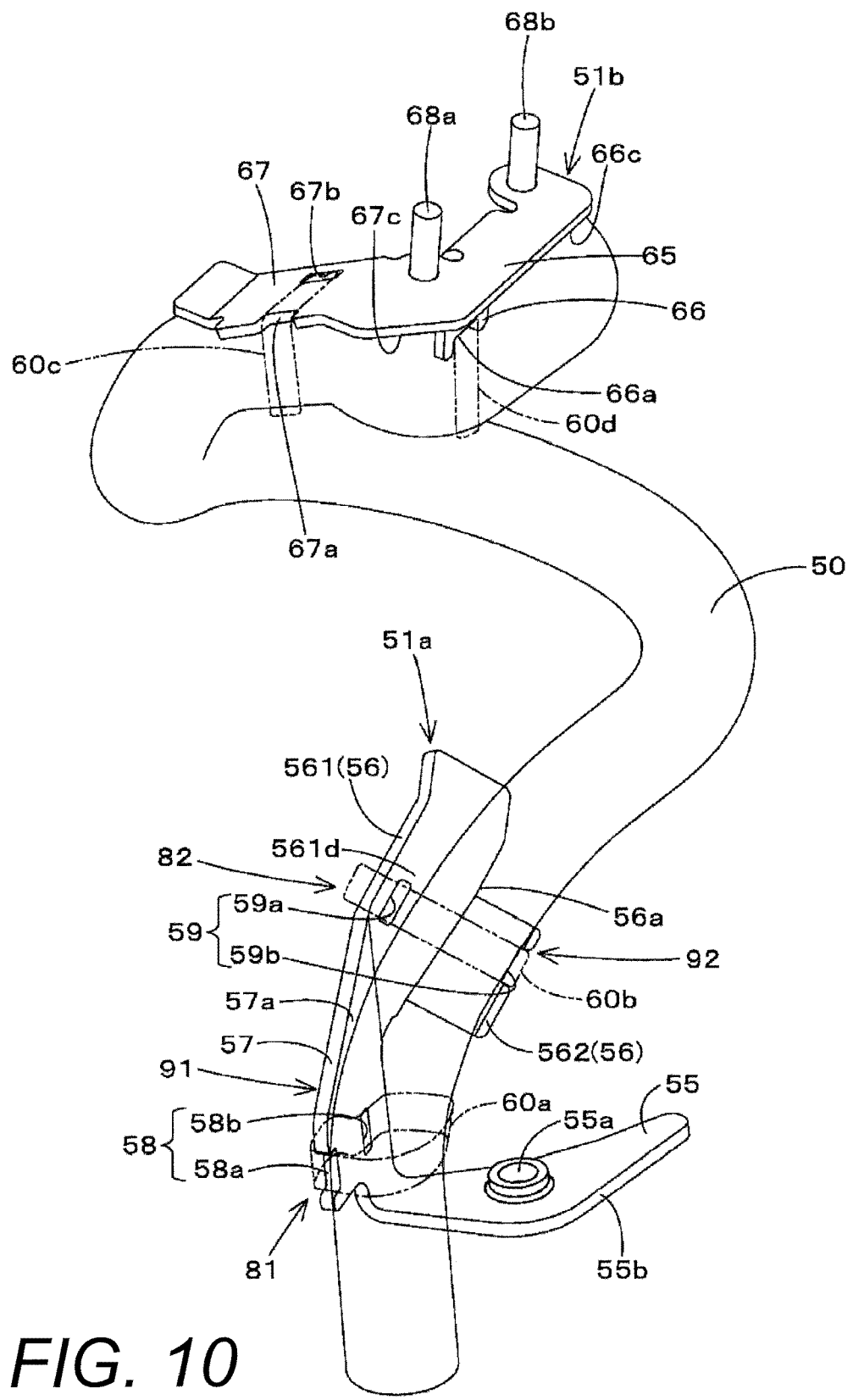
FIG. 10 is a perspective view of a cable wiring structure according to the first embodiment and illustrates a relation between a bracket and a cable.

As illustrated in FIG. 10, the cable 50 (harness 50) has a wiring structure in which the cable 50 (harness 50) is supported by at least two fixing parts (holders) including a first fixing part 81 (a first holder 81) for fixing the cable 50 (harness 50) and a second fixing part 82 (a second holder 82) for fixing the cable 50 (harness 50). The second fixing part 82 is provided away from the first fixing part 81. The second fixing part 82 fixes the cable 50 (harness 50) while permitting bending of the cable 50 (harness 50) more than the first fixing part 81. In other words, force for binding the cable 50 (harness 50) by the second fixing part 82 is set weaker than that by the first fixing part 81.

The first fixing part 81 has a first guide part 91 that guides the cable 50 (harness 50) and a first binding member 60*a* that binds the cable 50 (harness 50) to the first guide part 91. The first binding member 60*a* is a band-like member that can be bent and is, for example, a binding band made of a synthetic resin.

The second fixing part 82 has a second guide part 92 that guides the cable 50 (harness 50) at a position different from the first guide part 91 and a second binding member 60*b* that binds the cable 50 (harness 50) to the second guide part 92. The second binding member 60*b* is a band-like member that can be bent and is, for example, a binding band made of a synthetic resin. In the present embodiment, the first guide part 91 and the second guide part 92 are constituted by an identical bracket (first bracket) 51*a* (the first guide member 51*a*), i.e., integral bracket 51*a* (the first guide member 51*a*). Note that the first guide part 91 and the second guide part 92 may be constituted by separate brackets.

The bracket 51*a* (the first guide member 51*a*), the first guide part 91, and the first binding member 60*a* are described below.

The bracket 51*a* (the first guide member 51*a*) is a member that is capable of guiding (setting) the cable 50 (harness 50) in a route through which the cable 50 (harness 50) extends from the main body 43 (flange 43*a*) to the grip part 40 while circling around the shaft 41. The bracket 51*a* (the first guide member 51*a*) is provided on the flange 43*a* of the main body 43. The bracket 51*a* (the first guide member 51*a*) is made of a material having rigidity high enough not to be deformed when the cable 50 (harness 50) is bound (preferably, a material having higher rigidity than the cable 50 (harness 50)), for example, a metal material such as iron or steel. Specifically, the bracket 51*a* (the first guide member 51*a*) is constituted by a single metal plate that is bent.

The bracket 51*a* (the first guide member 51*a*) includes an attachment part 55, a first plate 561, a second plate 562, a first plate member 57 (a third plate 57), and a fourth plate 63 in addition to the first guide part 91 and the second guide part 92. In the bracket 51*a* (the first guide member 51*a*), the attachment part 55, the first guide part 91, and the second guide part 92 are provided at different positions.

Figure 9A:
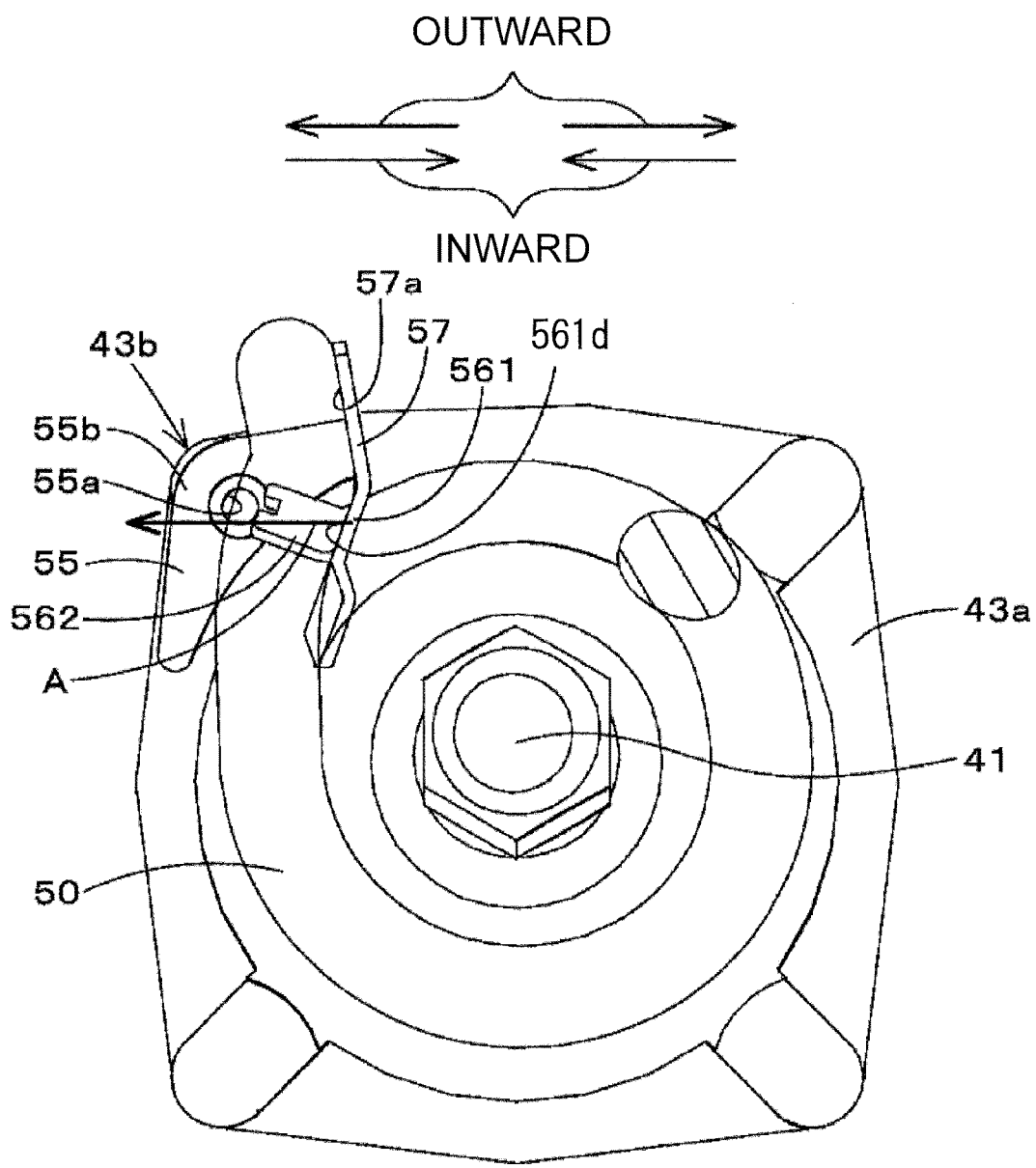
FIG. 9A is a plan view of a bracket and the cable.

As illustrated in FIGS. 3, 5, and 9A, the attachment part 55 is attached to the corner 43*b* of the flange 43*a* and has an insertion hole 55*a* into which the fastener 48*d* such as a bolt is to be inserted. The attachment part 55 has an edge part 55*b* that is substantially disposed along the corner 43*b* in a plan view. The attachment part 55 (bracket 51*a* (the first guide member 51*a*)) can be attached to the flange 43*a* by inserting the fastener 48*d* into the insertion hole 55*a* and an insertion hole provided in the corner 43*b* while matching the edge part 55*b* of the attachment part 55 with the corner 43*b* so that a lower surface of the attachment part 55 and an upper surface of the flange 43*a* face each other.

That is, the bracket 51*a* (the first guide member 51*a*) can be attached to the main body 43 by using a single insertion hole provided at the corner 43*b* among four insertion holes provided in the flange 43*a*. For convenience of description, the bracket 51*a* (the first guide member 51*a*), the first guide part 91, and the second guide part 92 in a state where the attachment part 55 (bracket 51*a* (the first guide member 51*a*)) is attached to the main body 43 are described.

The first guide part 91 guides (sets) the cable 50 (harness 50) above the attachment part 55 and below the second guide part 92. The first guide part 91 includes the first plate member 57 (the third plate 57) and a plurality of (two or more) first restraining parts 58.

Figure 11A:
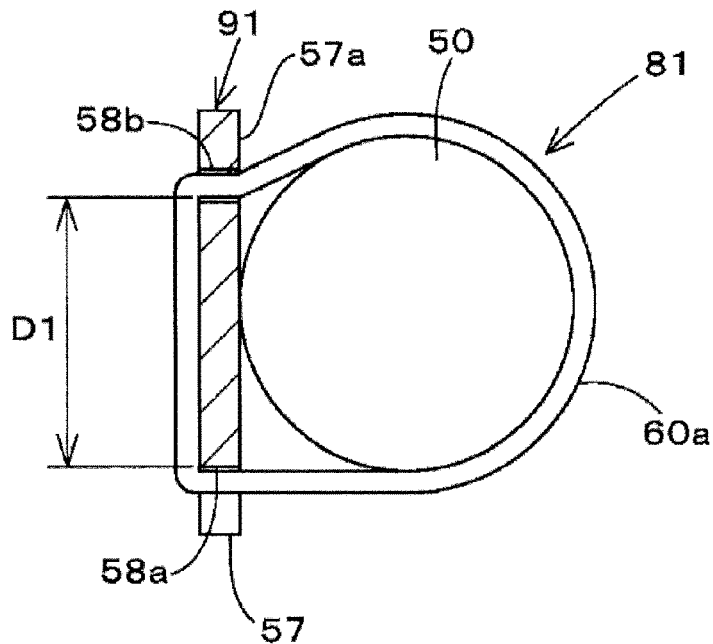
FIG. 11A is a lateral cross-sectional view of a first fixing part.

The first plate member 57 (the third plate 57) is a plate with which the cable 50 (harness 50) makes contact when the cable 50 (harness 50) is bound, i.e., in a bound state and rises from an end of the attachment part 55 toward the upper side (grip part 40 side) and extends backward. As illustrated in FIGS. 10 and 11A, the plurality of first restraining parts 58 are a recess 58*a* provided on a front end of the first plate member 57 (the third plate 57) and an insertion hole 58*b* that is provided in the first plate member 57 (the third plate 57) so as to be located behind the recess 58*a*. A distance D1 between the recess 58*a* and the insertion hole 58*b* of the first plate member 57 (the third plate 57) is preferably set equal to or longer than an external diameter of the cable 50 (harness 50).

As illustrated in FIGS. 10 and 11A, to fix the cable 50 (harness 50) to the first guide part 91 (first plate member 57 (the third plate 57)), part of the first binding member 60*a* is fitted into the recess 58*a* in a state where the cable 50 (harness 50) is close to the first plate member 57 (the third plate 57). In the state where the first binding member 60*a* is fitted into the recess 58*a*, movement of the first binding member 60*a* is restrained by the recess 58. Furthermore, part of the first binding member 60*a* is inserted into the insertion hole 58*b*. In the state where the first binding member 60*a* is inserted into the insertion hole 58*b*, movement of the first binding member 60*a* is restrained. The cable 50 (harness 50) can be bound to the first guide part 91 by shortening the length of the first binding member 60*a* in the state where the first binding member 60*a* is inserted into the recess 58*a* and the insertion hole 58*b*.

As illustrated in FIG. 10, the second guide part 92 is provided above the first guide part 91 and guides (sets) the cable 50 (harness 50). The second guide part 92 includes a second plate member 56 and a plurality of (two or more) second restraining parts 59.

The second plate member 56 is a member that is continuous with the first plate member 57 (the third plate 57) and extends in at least two directions. The second plate member 56 is a plate with which the cable 50 (harness 50) makes contact when the cable 50 (harness 50) is bound, i.e., in a bound state and includes the first plate 561 extending in a first direction and the second plate 562 extending in a second direction different from the first direction. Since the first plate 561 and the second plate 562 extend in different directions, the expressions "first direction" and "second direction" are used in the present embodiment in order to distinguish these directions, but the directions are not limited to the ones described in the embodiment.

The first plate 561 is provided at a rear end of the first plate member 57 (the third plate 57), and extends upward from a front end to a rear end thereof in side view and extends away from the shaft 41 in the width direction from the front end to the rear end thereof in a plan view. In other words, assume that a direction toward the center of the shaft 41 is an inward direction and a direction away from the center of the shaft 41 is an outward direction in the width direction as illustrated in FIG. 9A, the first plate 561 extends in the outward direction (arrow A) of the shaft 41 in the width direction from the front end to the rear end thereof in a plan view. The first plate 561 has at least one second restraining part 59.

The second plate 562 is provided along a lower part 56a (a lower end 56a) of the first plate 561. The second plate 562 extends from the lower part 56a (the lower end 56a) of the first plate 561 to a direction away from the shaft 41 (outward). In other words, the second plate 562 extends from a rear lower edge of the first plate 561 at a right angle to the first plate 561. That is, the first plate 561 and the second plate 562 are continuous with each other so as to form an L-shape. The second plate 562 extends upward from the front end to the rear end thereof. The fourth plate 63 is provided at a rear end of the first plate 561. The fourth plate 63 extends toward the shaft 41.

The plurality of second restraining parts 59 include an insertion hole 59a provided in the first plate 561 and a recess 59b provided in the second plate 562. The insertion hole 59a is provided at a part that is above and on the left of the recess 59b. The recess 59b is provided at a front end (outer end) of the second plate 562.

Figure 11B:
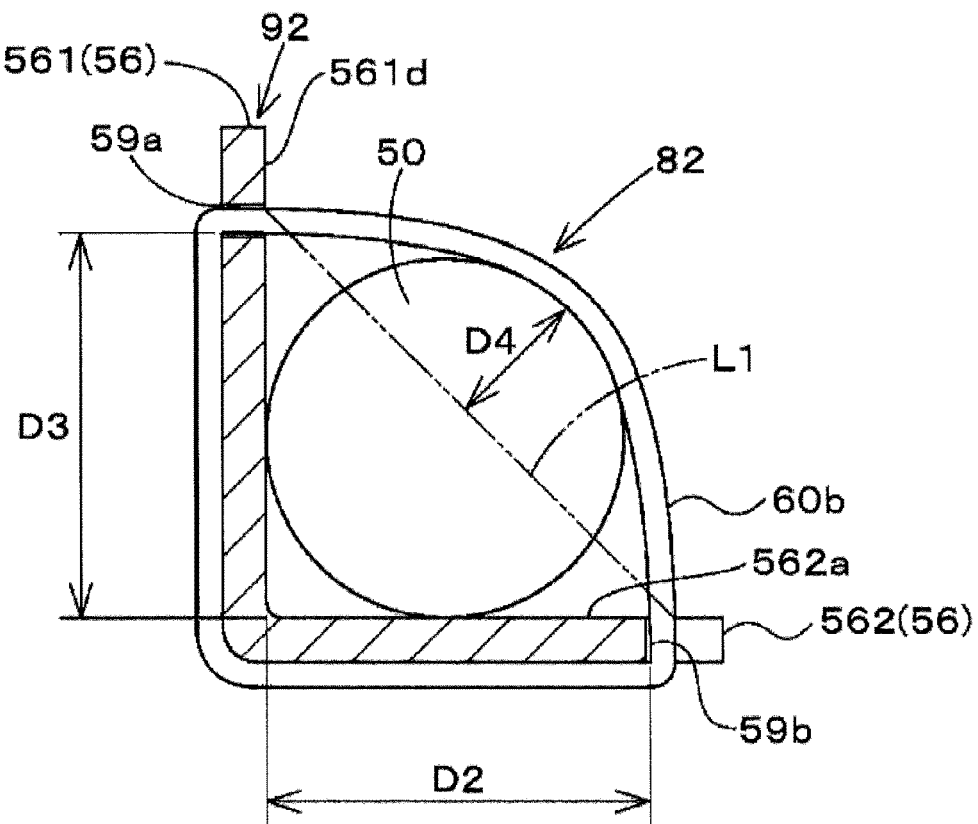
FIG. 11B is a lateral cross-sectional view of a second fixing part.

As illustrated in FIGS. 10 and 11B, to fix the cable 50 (harness 50) to the second guide part 92 (the second plate member 56), part of the second binding member 60b is fitted into the recess 59b in a state where the cable 50 (harness 50) is close to the second plate member 56. In the state where the second binding member 60b is fitted into the recess 59b, movement of the second binding member 60b is restrained by the recess 59b. Furthermore, part of the second binding member 60b is inserted into the insertion hole 59a of the second plate member 56. In the state where the second binding member 60b is inserted into the insertion hole 59a, movement of the second binding member 60b is restrained. The cable 50 (harness 50) can be bound to the second guide part 92 by shortening the length of the second binding member 60b in the state where the second binding member 60b is inserted into the insertion hole 59a and the recess 59b.

Next, fixation of the cable 50 (harness 50) at the first fixing part 81 and the second fixing part 82 is described in detail. For convenience of description, surfaces of the first plate member 57 (the third plate 57) and the second plate member 56 (the first plate 561 and the second plate 562) that face outward are referred to as outer surfaces.

As illustrated in FIGS. 10 and 11B, the cable 50 (harness 50) is attached to the second plate member 56 by inserting the second binding member 60b into the insertion hole 59a and the recess 59b of the second plate member 56 of the second fixing part 82 and winding the second binding member 60b around an outer surface of the cable 50 (harness 50). In the state where the cable 50 (harness 50) is attached to the second plate member 56, the cable 50 (harness 50) is in contact with an outer surface 561d of the first plate 561 of the second plate member 56 and extends along the outer surface 561d. A lower part of the cable 50 (harness 50) is in contact with an upper surface 562a of the second plate 562 of the second plate member 56 and is supported by the upper surface 562a. As described above, the first plate 561 extends away from the shaft 41 in the width direction from the front end to the rear end thereof in a plan view. Accordingly, the cable 50 (harness 50) is guided by the first plate 561 to the direction away from the shaft 41. The second plate 562 shifts upward from the front end to the rear end thereof. Accordingly, the cable 50 (harness 50) is guided upward by the second plate 562 from the front end to the rear end thereof. Accordingly, the cable 50 (the harness 50) is guided in a longitudinal direction of the shaft 41 by the second plate 562.

As described above, at the second fixing part 82, the cable 50 (harness 50) makes contact with the first plate 561 and the second plate 562 by being bound by the second binding member 60b and is guided from back to forth and to the direction away from the shaft 41 as the cable 50 (harness 50) goes downward.

Note that in a case where the cable 50 (harness 50) is fixed to the second fixing part 82, the outer surface of the cable 50 (harness 50) is in contact with the second plate member 56 at two points. For example, as illustrated in FIG. 11B, one point on the outer surface of the cable 50 (harness 50) is in contact with the first plate 561, and a point that is away by 90 degrees from the one point in a circumferential direction is in contact with the second plate 562. It is preferable that a distance D2 from an internal angle part formed between the first plate 561 and the second plate 562 to the recess 59b and a distance D3 from the internal angle part to the insertion hole 59a be set equal to or longer than the external diameter of the cable 50 (harness 50).

As illustrated in FIGS. 10 and 11A, the lower part of the cable 50 (harness 50) is fixed to the first fixing part 81. More specifically, the cable 50 (harness 50) is attached to the first plate member 57 (the third plate 57) by inserting the first binding member 60a into the recess 58a and the insertion hole 58b of the first plate member 57 (the third plate 57) of the first fixing part 81 and winding the first binding member 60a around the outer surface of the cable 50 (harness 50). In the state where the cable 50 (harness 50) is attached to the first plate member 57 (the third plate 57), part of the cable 50 (harness 50) is in contact with an outer surface 57a of the first plate member 57 (the third plate 57) and extends along the outer surface 57a. In this way, the cable 50 (harness 50) can be shifted upward and backward by attaching the cable 50 (harness 50) to the first plate member 57 (the third plate 57). In other words, a position at which the cable 50 (harness 50) extending from the main body 43 starts to circle can be determined by the first plate member 57 (the third plate 57). A part of the cable 50 (harness 50) that is located before the part guided by the second plate member 56 is supported by the outer surface 57a of the first plate member 57 (the third plate 57) on the same side as the part that makes contact with the first plate 561 of the second plate member 56. Since the first plate member 57 (the third plate 57) with which the cable 50 (harness 50) makes contact is provided before the second plate member 56 that shifts the cable 50 (harness 50) outward, a direction of the cable 50 (harness 50) can be smoothly shifted outward.

As illustrated in FIGS. 11A and 11B, a contact area (second contact area) between the second binding member 60b and the cable 50 (harness 50) is smaller than a contact area (first contact area) between the first binding member 60a and the cable 50 (harness 50). That is, the first contact area, which is a total area of a part of the first binding member 60a that makes contact with an outer peripheral surface of the cable 50 (harness 50), is larger than the second contact area, which is a total area of a part of the second binding member 60b that makes contact with the outer peripheral surface of the cable 50 (harness 50). Furthermore, a contact pressure between the second binding member 60b and the cable 50 (harness 50) is smaller than a contact pressure between the first binding member 60a and the cable 50 (harness 50). That is, the strength of binding of the cable 50 (harness 50) by the second binding member 60b is smaller than that by the first binding member 60a.

At the second fixing part 82, the first plate 561 and the second plate 562 extend in different directions (at a right angle to each other). The second binding member 60b is suspended between the first plate 561 and the second plate 562 so as to be in contact with the insertion hole 59a provided in the first plate 561 and the recess 59b provided in the second plate 562. Accordingly, the second binding member 60b can move only to a virtual line L1 connecting the insertion hole 59a and the recess 59b, thereby preventing the second binding member 60b from strongly restraining the cable 50 (harness 50). That is, the strength of binding of the cable 50 (harness 50) by the second binding member 60b is restricted. As a result, the strength of binding of the cable 50 (harness 50) by the second binding member 60b is smaller than that by the first binding member 60a. Accordingly, the second fixing part 82 fixes the cable 50 (harness 50) while permitting bending (movement) of the cable 50 (harness 50) more than the first fixing part 81. Note that it is preferable that a distance D4 between a center of a contact part between the second binding member 60b and the cable 50 (harness 50) and the virtual line L1 be set equal to or shorter than a radius of the cable 50 (harness 50). This moderately restricts the strength of binding of the cable 50 (harness 50) by the second binding member 60b.

Since the second fixing part 82 fixes the cable 50 (harness 50) while permitting bending more than the first fixing part 81 as described above, it is possible to prevent cutoff of the electric wires in the cable 50 (harness 50). That is, since bending of the cable 50 (harness 50) is permitted to some degree at the second fixing part 82, the electric wires in the cable 50 (harness 50) can easily move in the tube, and it is therefore possible to prevent breaking (cutoff) of the electric wires. Furthermore, since the first fixing part 81 fixes the cable 50 (harness 50) permitting bending less than the second fixing part 82, the cable 50 (harness 50) is fixed at the first fixing part 81 with certainty.

In the present embodiment described above, the first fixing part 81 is provided closer to the attachment part 55, and the second fixing part 82 is provided farther from the attachment part 55. However, the position of the first fixing part 81 and the position of the second fixing part 82 may be exchanged with each other. That is, the strength of binding of the cable 50 (harness 50) on a side closer to the attachment part 55 may be set smaller than that on a side farther from the attachment part 55. In the present embodiment, the first guide part 91 and the second guide part 92 are provided as the identical bracket (bracket 51a (the first guide member 51a)). However, the first guide part 91 and the second guide part 92 may be provided as different brackets.

Figure 9B:
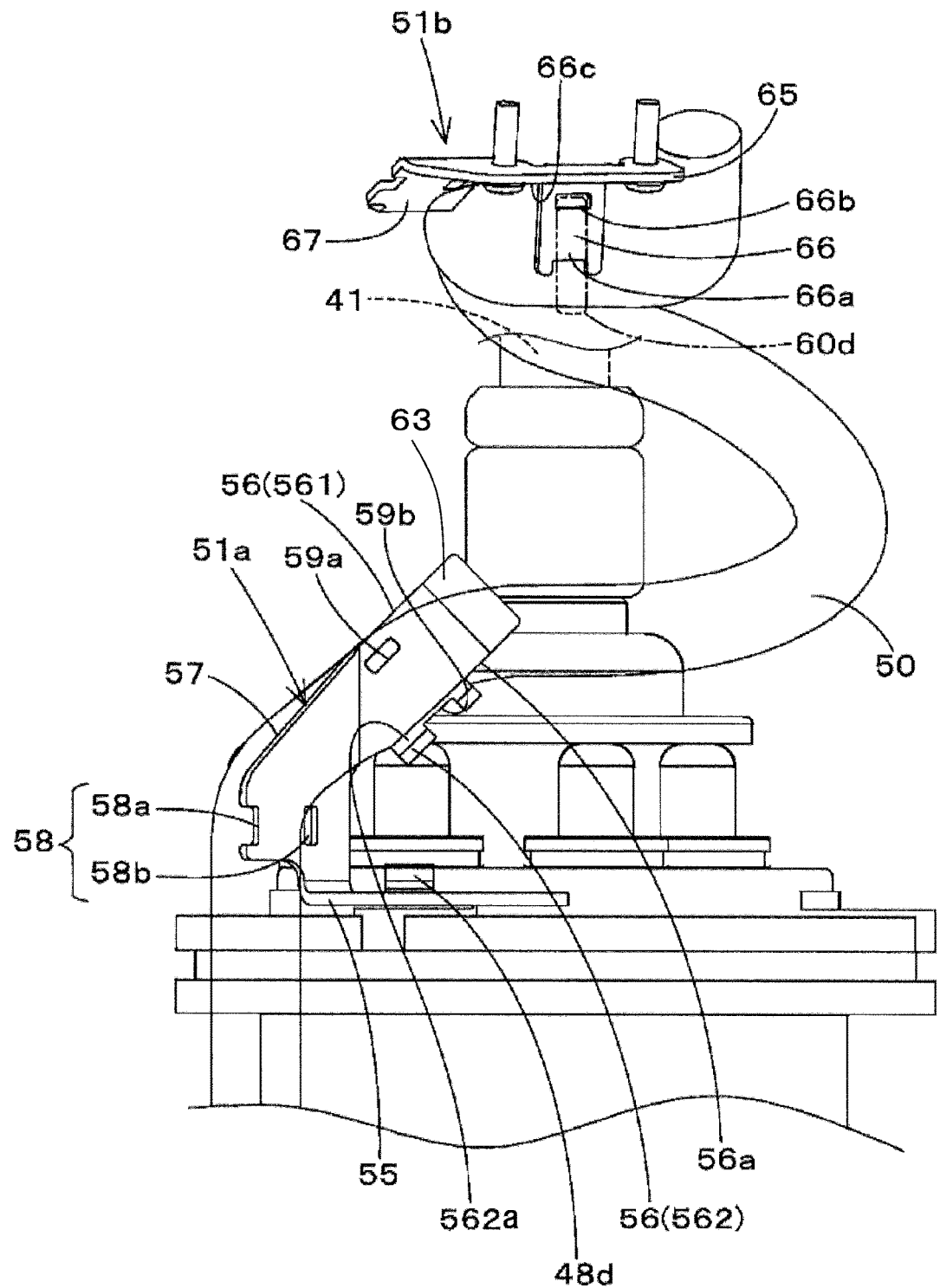
FIG. 9B is a side view of the bracket and the cable.

As illustrated in FIGS. 9B and 10, an upper part of the cable 50 (harness 50) is fixed by the bracket 51b (the second guide member 51b) that is different from the bracket 51a (the first guide member 51a).

The bracket 51b (the second guide member 51b) is made of a material having rigidity high enough not to be deformed when the cable 50 (harness 50) is bound (preferably, a material having higher rigidity than the cable 50 (harness 50)), for example, a metal material such as iron or steel. Specifically, the bracket 51b (the second guide member 51b) is constituted by a single metal plate that is bent and has an attachment part 65, a fourth plate member 67 (a sixth plate 67), and a fifth plate member 66 (a fifth plate 66), as illustrated in FIGS. 9B and 10.

Figure 13:
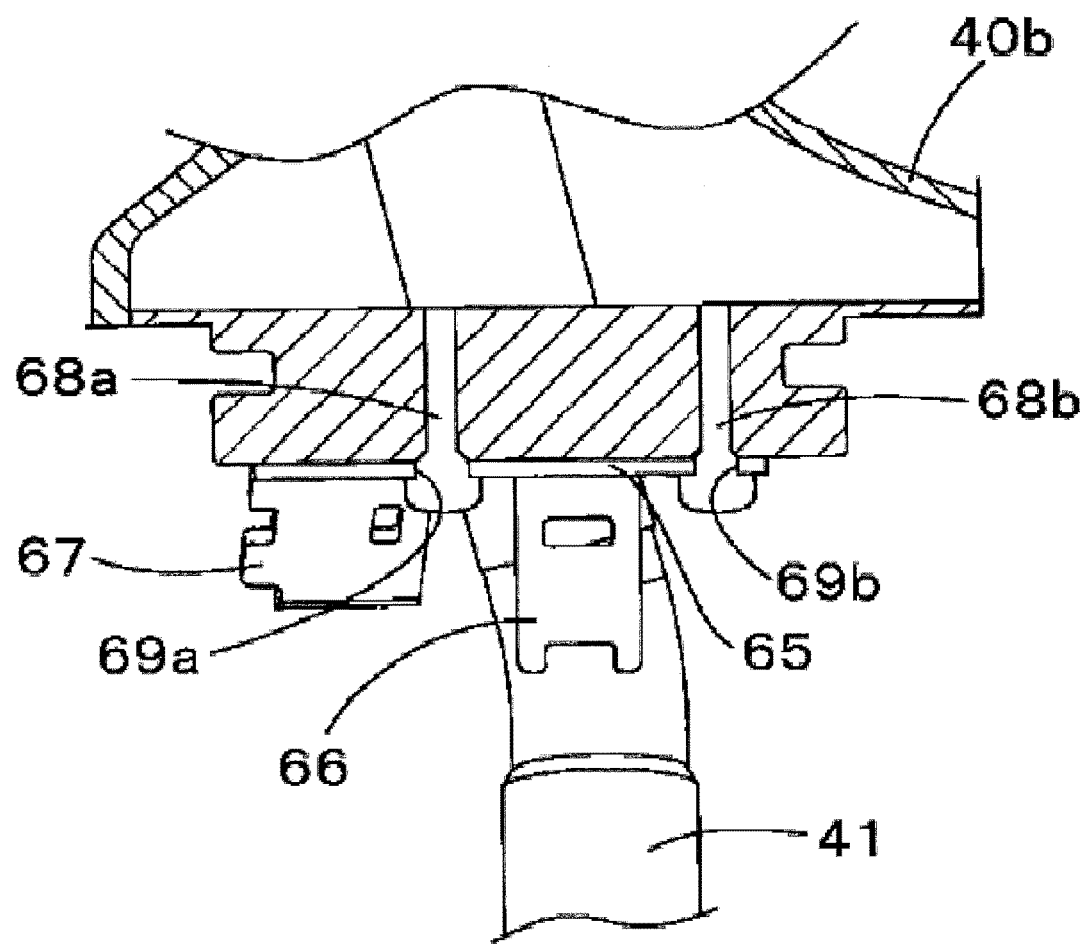
FIG. 13 is a cross-sectional view of a bracket and a flange of a grip part.

As illustrated in FIGS. 10 and 13, the attachment part 65 is attached to a flange 40b provided on a lower side of the grip part 40 and has insertion holes 69a and 69b into which fasteners 68a and 68b such as bolts are to be inserted. The attachment part 65 (bracket 51b (the second guide member 51b)) can be attached to the flange 40b by inserting the fasteners 68a and 68b into the insertion holes 69a and 69b and insertion holes provided in the flange 40b so that an upper surface of the attachment part 65 and a lower surface of the flange 40b face each other.

The fourth plate member 67 (the sixth plate 67) is located ahead of the fifth plate 66 and extends from a front part of the attachment part 65 toward the inner side. The fourth plate member 67 (the sixth plate 67) extends downward from left to right in front view. In other words, the fourth plate member 67 (the sixth plate 67) extends upward from the inner side to the outer side in front view when viewed from the route of the cable 50 (harness 50). The fourth plate member 67 (the sixth plate 67) has a recess 67a at a front end thereof. Furthermore, the fourth plate member 67 (the sixth plate 67) has an insertion hole 67b behind the recess 67a.

The fifth plate member 66 (the fifth plate 66) is located behind the fourth plate member 67 (the sixth plate 67) and extends downward from a left end part (inner end part) of the attachment part 65. The fifth plate member 66 (the fifth plate 66) has a recess 66a at a lower end thereof. Furthermore, the fifth plate member 66 (the fifth plate 66) has an insertion hole 66b above the recess 66a.

Next, a relation between the fifth plate member 66 (the fifth plate 66) and the fourth plate member 67 (the sixth plate 67), and the cable 50 (harness 50) is described. For convenience of description, surfaces of the fifth plate member 66 (the fifth plate 66) and the fourth plate member 67 (the sixth plate 67) that face inward are referred to as outer surfaces. The cable 50 (harness 50) is attached to the fourth plate member 67 (the sixth plate 67) by inserting a third binding member 60c into the recess 67a and the insertion hole 67b of the fourth plate member 67 (the sixth plate 67) and winding the third binding member 60c around an outer surface of the cable 50 (harness 50). In the state where the cable 50 (harness 50) is attached to the fourth plate member 67 (the sixth plate 67), part of the cable 50 (harness 50) is in contact with a lower surface 67c of the fourth plate member 67 (the sixth plate 67) and extends along the lower surface 67c. Since the fourth plate member 67 (the sixth plate 67) extends upward from the inner side to the outer side in front view as described above, the cable 50 (harness 50) is guided in a longitudinal direction of the shaft 41 by the fourth plate member 67 (the sixth plate 67) while being guided in the width direction. That is, the fourth plate member 67 (the sixth plate 67) guides the cable 50 (harness 50) in the width direction and guides the cable 50 (harness 50) in the longitudinal direction of the shaft 41.

As illustrated in FIG. 9B, the cable 50 (harness 50) is attached to the fifth plate member 66 (the fifth plate 66) by inserting a fourth binding member 60d into the recess 66a and the insertion hole 66b of the fifth plate member 66 (the fifth plate 66) and winding the fourth binding member 60d around the outer surface of the cable 50 (harness 50). In the state where the cable 50 (harness 50) is attached to the fifth plate member 66 (the fifth plate 66), part of the cable 50 (harness 50) is in contact with an outer surface 66c of the fifth plate member 66 (the fifth plate 66) and extends along the outer surface 66c. Since the fifth plate member 66 (the fifth plate 66) extends downward from the left end part (inner end part) of the attachment part 65 as described above, the cable 50 (harness 50) is guided back and forth by the fifth plate member 66 (the fifth plate 66). That is, the fifth plate member 66 (the fifth plate 66) guides the cable 50 (harness 50) back and forth.

Since the cable 50 (harness 50) is guided to a predetermined position below the grip part 40 by the fourth plate member 67 (the sixth plate 67) and the fifth plate member 66 (the fifth plate 66), the cable 50 (harness 50) can be smoothly shifted from the position below the grip part 40 toward the inside of the grip part 40.

Figure 12A:
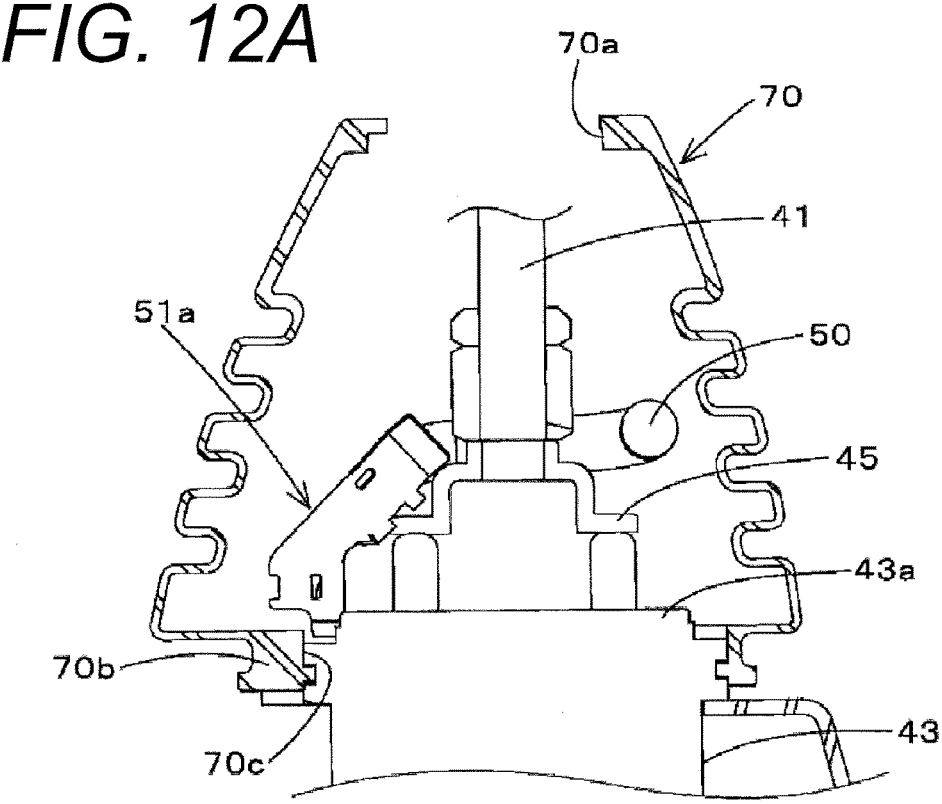
FIG. 12A is a cross-sectional view of a cover member.
Figure 12B:
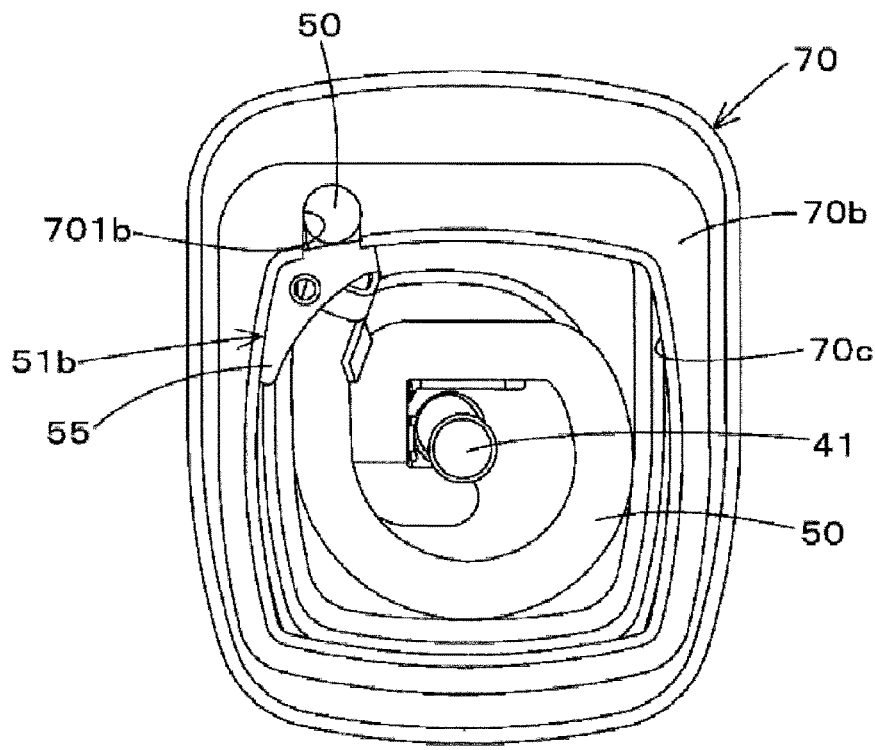
FIG. 12B is a view obtained when the cover member is viewed from below.

As illustrated in FIGS. 1, 12A, and 12B, the operation device 25 has a cover member 70. The cover member 70 is a member that covers the shaft 41 and the cable 50 (harness 50) from an outside below the grip part 40 and is, for example, a bellows cover. The cover member 70 has a cylindrical shape that expands in the front-rear direction and the width direction from an upper side to a lower side thereof. The cover member 70 has, at an upper part thereof, an insertion hole 70a into which the shaft 41 and the cable 50 (harness 50) are to be inserted. A lower part (lower surface) 70b of the cover member 70 has a circular edge part 70c. In a plan view, the edge part 70c has a substantially rectangular shape, which is substantially the same as a contour (contour formed by an edge) of the flange 43a. The flange 43a can be covered with the edge part 70c (lower surface 70b side) in the cover member 70. A groove 701b is provided in the edge part 70c at the corner 43b of the flange 43a. The groove 701b is a cutout of the rectangular edge part 70c (lower surface 70b). The cable 50 (harness 50) can be inserted into the groove 701b.

Since the cable 50 (harness 50) can be inserted into the groove 701b, the cable 50 (harness 50) attached to the bracket 51a (the first guide member 51a) can be shifted along the outer surface of the main body 43.

According to the operation device 25 described above, in which the cable 50 (harness 50) is routed so as to circle around the shaft 41, stress (force) that is applied to the cable 50 (harness 50) can be distributed in a case where the shaft 41 is swung forward, backward, leftward, or rightward. It is therefore possible to prevent stress from being concentrated onto a predetermined point of the cable 50 (harness 50). Furthermore, the circling state (spiraling state) of the cable 50 (harness 50) can be stably maintained around the shaft 41 by the bracket 51 (the guide members 51) (the bracket 51a (the first guide member 51a) and the bracket 51b (the second guide member 51b)).

In the above embodiment, the operation device 25 is a device that changes the pressure of operating oil that is fed from the operation valve 46 by swinging a lever (the grip part 40 and the shaft 41). Alternatively, however, the operation device 25 may be a device that changes an electric signal (e.g., a voltage) in accordance with an operation. That is, the operation device 25 may be a joystick.

In the above embodiment, the operation device 25 includes the main body 43 and the operation valve 46, i.e., an operation unit 42. Alternatively, however, an embodiment of the present invention is also applicable to an operation device 25 including no operation unit 42. In this case, it is only necessary that the harness 50 extend from one end (lower end) to the other end (upper end) of the shaft 41 while circling around the shaft 41.

Second Embodiment

Figure 14:
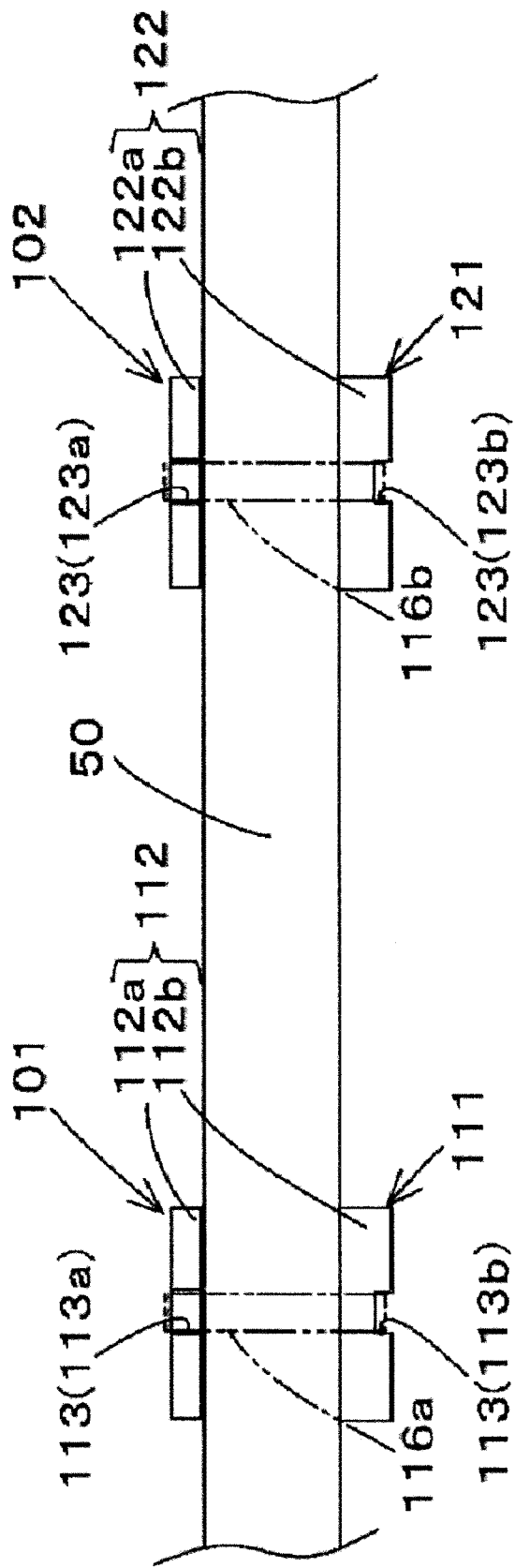
FIG. 14 is a plan view of a cable wiring structure according to a second embodiment and illustrates a relation between a bracket and a cable.
Figure 15A:
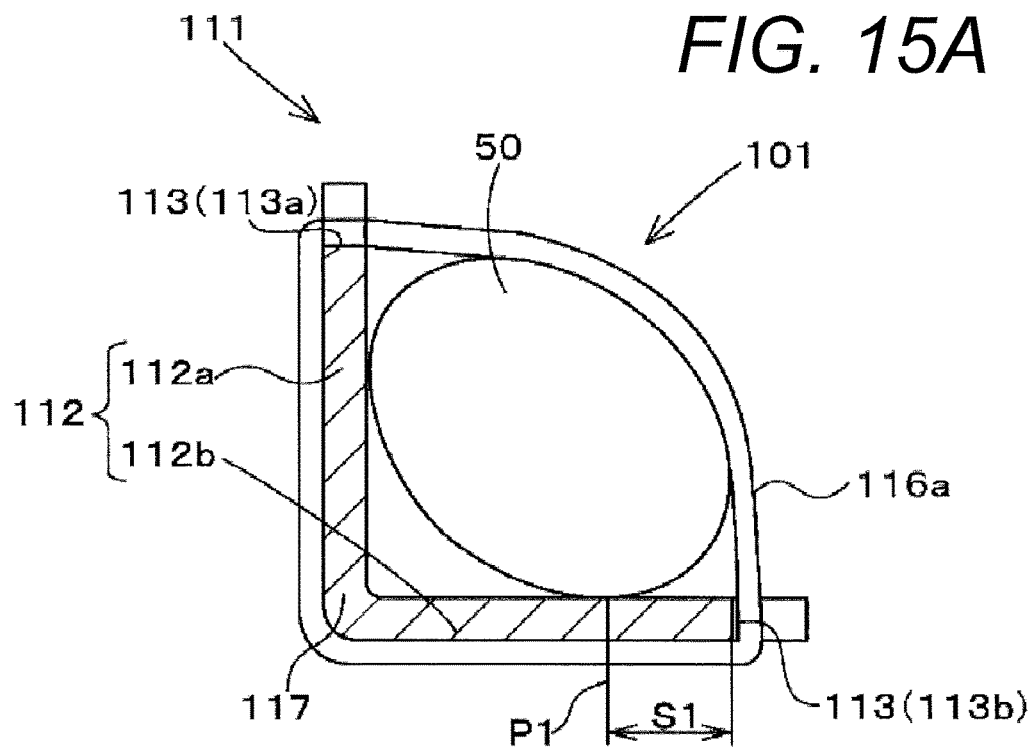
FIG. 15A is a lateral cross-sectional view of a first fixing part.
Figure 15B:
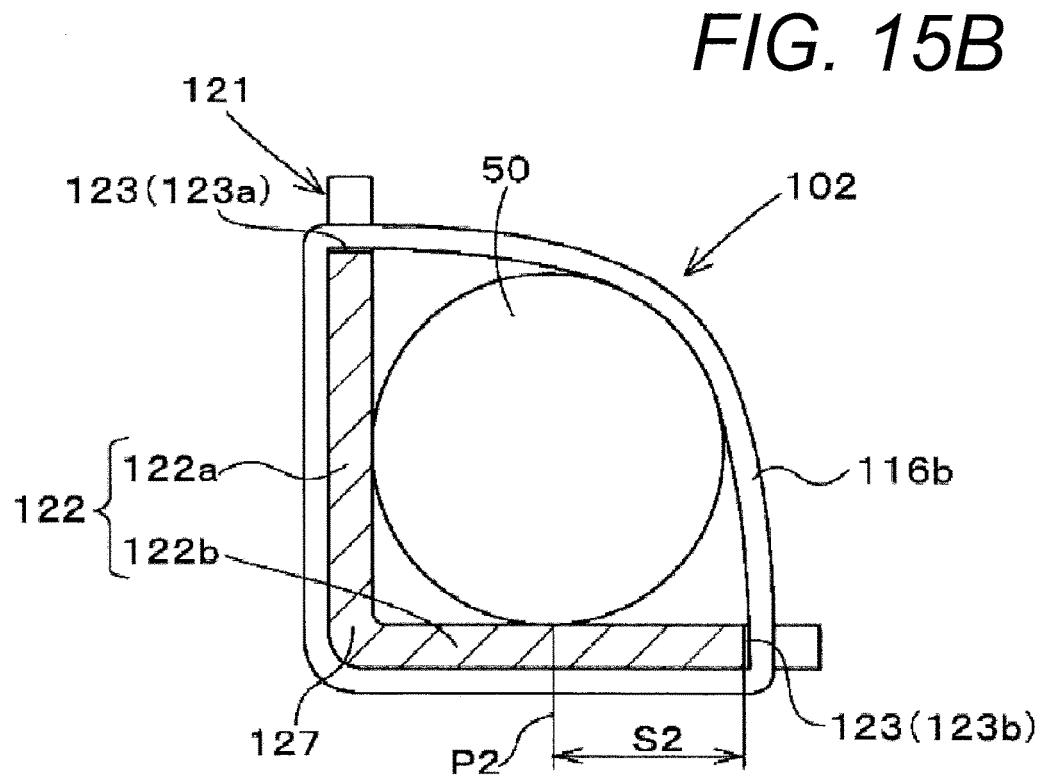
FIG. 15B is a lateral cross-sectional view of a second fixing part.

FIGS. 14, 15A, and 15B illustrate a cable wiring structure according to the second embodiment. The cable wiring structure according to the second embodiment is a structure for connecting a first appliance and a second appliance that are mounted in a work machine, as in the first embodiment. Each of the first appliance and the second appliance may be any appliance to which an electric signal is transmitted, i.e., any appliance connected by a cable through which electricity is passed and is, for example, a display device, a sensor of various kinds, a switch, a control device constituted by a CPU or the like, and an operation device. Note that description of elements similar to those in the first embodiment is omitted.

As illustrated in FIG. 14, a cable 50 (harness 50) that connect at least the first appliance and the second appliance is fixed to a first fixing part 101. The first fixing part 101 is fixed, for example, to a vehicle (body) of a work machine. Note that it is only necessary that the first fixing part 101 be fixed to the work machine, and a place where the first fixing part 101 is fixed is not limited.

The first fixing part 101 has a first guide part 111 and a first binding member 116a. The first binding member 116a is a band-like member that can be bent and is, for example, a binding band made of a synthetic resin.

The first guide part 111 is for guiding the cable 50 (harness 50) and includes a plate member (hereinafter referred to as a first plate member) 112 and a plurality of (two or more) first restraining parts 113 provided in the first plate member 112.

The first plate member 112 has a first plate 112a extending in a first direction and a second plate 112b extending in a second direction different from the first direction. As illustrated in FIG. 15A, the first plate 112a and the second plate 112b form an L-shape.

As illustrated in FIG. 15A, the plurality of first restraining parts 113 include a recess 113a that is provided in the first plate 112a at an end opposite to an intersecting part 117 at which the first plate 112a and the second plate 112b intersect each other and a recess 113b that is provided in the second plate 112b at an end opposite to the intersecting part 117.

The cable 50 (harness 50) can be attached to the first plate member 112 (the first plate 112a and the second plate 112b) by inserting the first binding member 116a into the recess 113a of the first plate member 112, winding the first binding member 116a around an outer surface of the cable 50 (harness 50), and then inserting the first binding member 116a into the recess 113b of the second plate 112b in the first fixing part 101.

As illustrated in FIG. 14, the cable 50 (harness 50) is also fixed to a second fixing part 102 at a position away from the first fixing part 101. That is, in the present embodiment, the cable 50 (harness 50) is linearly routed, and the cable 50 (harness 50) is fixed by the first fixing part 101 and the second fixing part 102. The second fixing part 102 is fixed, for example, to the vehicle (body) of the work machine. Note that it is only necessary that the second fixing part 102 be fixed to the work machine, and a place where the second fixing part 102 is fixed is not limited.

The second fixing part 102 has a second guide part 121 and a second binding member 116b. The second binding member 116b is a band-like member that can be bent and is, for example, a binding band made of a synthetic resin.

The second guide part 121 is for guiding the cable 50 (harness 50) and includes a plate member (referred to as a second plate member) 122 and a plurality of (two or more) second restraining parts 123 provided in the second plate member 122.

The second plate member 122 has a first plate 122a extending in a first direction and a second plate 122b extending in a second direction that is different from the first direction. As illustrated in FIG. 15B, the first plate 122a and the second plate 122b form an L-shape.

As illustrated in FIG. 15B, the plurality of second restraining parts 123 include a recess 123a that is provided in the first plate 122a at an end opposite to an intersecting part 127 at which the first plate 122a and the second plate 122b intersect each other and a recess 123b provided in the second plate 122b at an end opposite to the intersecting part 127.

As illustrated in FIGS. 14 and 15B, the cable 50 (harness 50) can be attached to the second plate member 122 (the first plate 122a and the second plate 122b) by inserting the second binding member 116b into the recess 123a of the second plate member 122, winding the second binding member 116b around the outer surface of the cable 50 (harness 50), and then inserting the second binding member 116b into the recess 123b of the second plate 122b in the second fixing part 102.

As illustrated in FIGS. 15A and 15B, a contact area (second contact area) between the second binding member 116b and the cable 50 (harness 50) is smaller than a contact area (first contact area) between the first binding member 116a and the cable 50 (harness 50). A contact pressure between the second binding member 116b and the cable 50 (harness 50) is smaller than a contact pressure between the first binding member 116a and the cable 50 (harness 50). That is, the strength of binding of the cable 50 (harness 50) by the second binding member 116b is smaller than that by the first binding member 116a.

Assume that a distance between a contact position P1 at which an outer peripheral surface of the cable 50 (harness 50) makes contact with the first plate member 112 and one of the first restraining parts 113 that is closest to the contact position P1 is S1. Assume also that a distance between a contact position P2 at which the outer peripheral surface of the cable 50 (harness 50) makes contact with the second plate member 122 and one of the second restraining parts 123 that is closest to the contact position P2 is S2. In this case, the distance S1 is shorter than the distance S2. In a case where the distance S1 between the contact position P1 and the restraining part and the distance S2 between the contact position P2 and the restraining part are short, the cable 50 (harness 50) is deformed much, and therefore the strength of binding by the binding member is large. Meanwhile, in a case where the distance S1 and the distance S2 are long, the strength of binding by the binding member is small. Since the distance S1 is shorter than the distance S2 as described above, the strength of binding of the cable 50 (harness 50) by the second binding member 116b is smaller than that by the first binding member 116a. Note that in a case where the outer peripheral surface of the cable 50 (harness 50) and the first plate member 112 are in surface contact with each other, the contact position P1 is a position that is closest to the first restraining parts 113. Similarly, in a case where the outer peripheral surface of the cable 50 (harness 50) and the second plate member 122 are in surface contact with each other, the contact position P2 is a position that is closest to the second restraining parts 123.

As indicated by the second embodiment, the second fixing part 102 (second plate member 122) can be bent more than the first fixing part 101 (first plate member 112) even in a case where the cable 50 (harness 50) is linearly disposed.

Note that the embodiments disclosed herein are illustrative examples in all respects and are not restrictive. The scope of the present invention is defined by the claims rather than the above description and encompasses all changes within meaning and range equivalent to the scope of the claims.

Obviously, numerous modifications and variations of the present invention are possible in light of the above teachings. It is therefore to be understood that within the scope of the appended claims, the invention may be practiced otherwise than as specifically described herein.

What is claimed is:
1. A cable wiring structure comprising:
a cable connecting a first appliance mounted in a work machine and a second appliance mounted in the work machine to transmit an electric signal, the cable including a first held part and a second held part different from the first held part;
a first holder holding the cable at the first held part, the first holder having a first guide part that guides the cable and a first binding member that binds the cable to the first guide part; and
a second holder holding the cable at the second held part, a first range in which the cable bends at the first held part being smaller than a second range in which the cable bends at the second held part, the second holder having a second guide part that guides the cable and a second binding member that binds the cable to the second guide part, a contact area between the cable and the second binding member in a state where the cable is bound being smaller than a contact area between the cable and the first binding member in a state where the cable is bound.

2. The cable wiring structure according to claim 1, wherein
the first guide part includes a first plate member which the cable contacts in the state where the cable is bound and two or more first restraining parts that are provided in the first plate member and which the first binding member contacts so that movement of the first binding member is restrained,
the second guide part includes a second plate member which the cable contacts in the state where the cable is bound and two or more second restraining parts that are provided in the second plate member and which the second binding member contacts so that movement of the second binding member is restrained, and
the second plate member includes a first plate that extends in a first direction and in which at least one of the second restraining parts is provided and a second plate that extends in a second direction different from the first direction and in which at least one of the second restraining parts is provided.

3. The cable wiring structure according to claim 2, wherein
the first plate member and the second plate member are made of a metal material.

4. An operation device comprising:
a grip part;
a shaft attached to the grip part; and
the cable wiring structure according to claim 1, the cable reaching the grip part.

5. The operation device according to claim 4, wherein
the first guide part includes a first plate member which the cable contacts in the state where the cable is bound and two or more first restraining parts that are provided in the first plate member and which the first binding member contacts so that movement of the first binding member is restrained, the second guide part includes a second plate member which the cable contacts in the state where the cable is bound and two or more second restraining parts that are provided in the second plate member and which the second binding member contacts so that movement of the second binding member is restrained, and the second plate member includes a first plate that extends in a first direction and in which at least one of the second restraining parts is provided and a second plate that extends in a second direction different from the first direction and in which at least one of the second restraining parts is provided.

6. The operation device according to claim 5, wherein the first plate member and the second plate member are made of a metal material.

7. A work machine comprising:
the cable wiring structure according to claim 1;
the first appliance; and
the second appliance.

8. The work machine according to claim 7, wherein
the first guide part includes a first plate member which the cable contacts in the state where the cable is bound and two or more first restraining parts that are provided in the first plate member and which the first binding member contacts so that movement of the first binding member is restrained, the second guide part includes a second plate member which the cable contacts in the state where the cable is bound and two or more second restraining parts that are provided in the second plate member and which the second binding member contacts so that movement of the second binding member is restrained, and the second plate member includes a first plate that extends in a first direction and in which at least one of the second restraining parts is provided and a second plate that extends in a second direction different from the first direction and in which at least one of the second restraining parts is provided.

9. The work machine according to claim 8, wherein the first plate member and the second plate member are made of a metal material.

10. The cable wiring structure according to claim 1, wherein the second appliance is movable with respect to the cable and wherein the second held part is provided between the second appliance and the first held part.

11. An operation device comprising:
a grip part;
a shaft attached to the grip part;
an operation valve connected to the shaft to act in accordance with a swing of the shaft;
a main body in which the operation valve is contained;
a harness circling around the shaft from the main body to an inside of the grip part, the harness having a first part and a second part provided between the first part and the grip part in a lengthwise direction of the harness; and
a guide member that is provided between the main body and the grip part and guides the harness, the guide member having a first plate that guides the harness to a direction away from the shaft in a route through which the harness runs from the main body to the grip part, the second part having a second surface to be contacted with the first plate, the second surface facing toward a second contacting direction with respect to the lengthwise direction, the second contacting direction being perpendicular to the lengthwise direction, the guide member having a third plate that is contactable with the first part, the first part having a first surface to be contacted with the third plate, the first surface facing toward a first contacting direction with respect to the lengthwise direction, the first contacting direction being substantially equal to the second contacting direction.

12. The operation device according to claim 10, wherein the guide member has a second plate that guides the harness in a longitudinal direction of the shaft.

13. The operation device according to claim 10, wherein the guide member has an attachment part attached to the main body.

14. The operation device according to claim 13, further comprising a cover member that covers the shaft and the harness, wherein
the cover member has a groove through which the harness passes.

15. An operation device comprising:
a grip part;
a shaft attached to the grip part, the shaft extending in a longitudinal direction and having a first end and a second end opposite to the first end in the longitudinal direction;
a harness circling around the shaft from the first end to the second end, the harness having a first part and a second part provided between the first part and the grip part in a lengthwise direction of the harness; and
a guide member that guides the harness, the guide member having a first plate that guides the harness to a direction away from the shaft in a route through which the harness extends from the first end of the shaft to the second end of the shaft, the second part having a second surface to be contacted with the first plate, the second surface facing toward a second contacting direction with respect to the lengthwise direction, the second contacting direction being perpendicular to the lengthwise direction, the guide member having a third plate that is contactable with the first part, the first part having a first surface to be contacted with the third plate, the first surface facing toward a first contacting direction with respect to the lengthwise direction, the first contacting direction being substantially equal to the second contacting direction.

16. The operation device according to claim 15, wherein the guide member has a second plate that guides the harness in the longitudinal direction of the shaft.

* * * * *